United States Patent [19]

Takemura et al.

[11] Patent Number: 4,988,548

[45] Date of Patent: * Jan. 29, 1991

[54] NOVEL VULCANIZABLE RUBBER COMPOSITIONS AND APPLICATIONS THEREOF

[75] Inventors: Yasuhiko Takemura; Shinichiro Zen; Yoshiaki Zama, all of Yokkaichi; Hiroji Enyo, Suzuka, all of Japan

[73] Assignee: Japan Synthetic Rubber Co., Ltd., Tokyo, Japan

[*] Notice: The portion of the term of this patent subsequent to Apr. 18, 2006 has been disclaimed.

[21] Appl. No.: 274,963

[22] Filed: Nov. 22, 1988

Related U.S. Application Data

[62] Division of Ser. No. 169,129, Mar. 10, 1988, Pat. No. 4,822,654.

[30] Foreign Application Priority Data

Jan. 31, 1985 [JP] Japan ................................. 60-15561
Mar. 30, 1985 [JP] Japan ................................. 60-67683

[51] Int. Cl.$^5$ ...................... C08L 37/16; C08L 27/00; C08L 27/12; F16L 11/04
[52] U.S. Cl. .................... 428/368; 523/437; 523/439; 523/455; 524/134; 524/136; 524/145; 524/308; 524/506; 524/508; 524/512; 524/513; 524/517; 524/518; 524/519; 524/520; 525/104; 525/108; 525/133; 525/155; 525/166; 525/179; 525/187; 525/199; 525/200
[58] Field of Search ............... 428/36.8; 523/437, 439, 523/455; 524/134, 136, 145, 308, 506, 508, 512, 513, 517–520; 525/104, 108, 133, 155, 106, 179, 187, 199, 200

[56] References Cited

U.S. PATENT DOCUMENTS 4,822,654 4/1989 Takemura et al. ................. 428/36.8

*Primary Examiner*—Herbert J. Lilling
*Attorney, Agent, or Firm*—Oblon, Spivak, McClelland, Maier & Neustadt

[57] ABSTRACT

A vulcanizable rubber composition comprising (1) 100 parts by weight of a polymer composition comprising
(I) a vinylidene fluoride resin,
(II) at least one rubber selected from the group consisting of acrylic rubbers, $\alpha,\beta$-unsaturated nitrile-conjugated diene copolymer rubbers and hydrides of $\alpha,\beta$-unsaturated nitrile-conjugated diene copolymer rubbers, said acrylic rubber consisting of (A) 30 to 99.9% by weight of an alkyl acrylate and/or an alkoxy-substituted alkyl acrylate, (B) 0.1 to 10% by weight of a crosslinkable monomer and (C) 0 to 70% by weight of another ethylenically unsaturated compound copolymerizable with (A) and (B) (the sum of (A), (B) and (C) is 100% by weight) and said $\alpha,\beta$-unsaturated nitrile-conjugated diene copolymer rubber consisting of (D) 10 to 60% by weight of an $\alpha,\beta$-unsaturated nitrile, (E) 15 to 90% by weight of a conjugated diene and (F) 0 to 75% by weight of another ethylenically unsaturated compound copolymerizable with (D) and (E) (the sum of (D), (E) and (F) is 100% by weight, and
(III) another blendable polymer,
wherein the weight ratio of (I)/[(II)+(III)] is 5/95 to 60/40 and the weight ratio (II)/(III) is 100/0 to 50/50, and (2) 0 to 40 parts by weight of a plasticizer. Said rubber composition excels not only in heat resistance, gasoline resistance and sour gasoline resistance but also in gasohol resistance and sour gasohol resistance and further is good in tensile strength, elongation and balance between gasoline resistance and low-temperature resistance. Therefore, said rubber composition can be used in the fluid-contacting surface of a diaphragm and can be suitably used as an inner tube of a fuel hose.

10 Claims, 1 Drawing Sheet

NOVEL VULCANIZABLE RUBBER COMPOSITIONS AND APPLICATIONS THEREOF

This is a division of application Ser. No. 07/169,129, filed Mar. 10, 1988, now U.S. Pat. No. 4,822,654, which in turn is a file wrapper continuation of application Ser. No. 06/823,021, filed Jan. 27, 1986, now abandoned.

This invention relates to a vulcanizable rubber composition which is excellent in gasoline resistance, gasohol resistance, sour gasoline resistance, sour gasohol resistance and balance between gasoline resistance and low-temperature resistance and has an excellent heat resistance, as well as to applications thereof.

In recent years, in automobiles, parts made from gasoline-resistant rubbers are in use in atmospheres whose temperatures are becoming increasingly higher in connection with countermeasures for exhaust gas regulations and engine modifications for higher performances. Hence, there is now required a gasoline (oil)-resistant rubber excellent in heat resistance. With respect to these gasoline-resistant rubbers, there is a further problem that gasoline is oxidized in fuel systems, etc. of automobiles to produce a sour gasoline [the sour gasoline refers to a gasoline containing peroxides produced by gasoline oxidation at high temperatures and it is described in detail in A. Nersasian, Rubber and Plastics News, June 26 (1978)], and this sour gasoline deteriorates gasoline-resistant rubbers.

In connection with tight supply of crudes on worldwide basis, addition of an alcohol to a gasoline has been tried. This gasoline-alcohol mixture, namely, gasohol is also oxidized to produce a sour gasohol and this sour gasohol deteriorates gasoline-resistant rubbers as well.

As gasoline-resistant rubbers, butadiene-acrylonitrile rubber has widely been used in such applications as hoses, gaskets, O-rings, packings and oil seals.

However, butadiene-acrylonitrile rubber is poor in heat resistance and insufficient in sour gasoline resistance, and therefore, it is difficult to provide a rubber part having a sufficient reliability even when used in contact with a gasoline at high temperatures as mentioned above.

In order to overcome the drawbacks of butadiene-acrylonitrile rubber, it is known to use a blend of butadiene-acrylonitrile rubber with poly(vinyl chloride), thereby improving the sour gasoline resistance and ozone resistance of the butadiene-acrylonitrile rubber [Japanese Patent Application Kokai (Laid-Open) No. 89,838/80]. However, this blend has no improved heat resistance and is insufficient in gasohol resistance.

It is also known to hydrogenate a butadiene-acrylonitrile rubber in order to improve its sour gasoline resistance and heat resistance [Japanese Patent Application Kokai (Laid-Open) No. 70,135/82]. The resulting hydride of butadiene-acrylonitrile rubber has a deteriorated permanent compression set and it cannot be said that the heat resistance, sour gasoline resistance and sour gasohol resistance of the hydride are sufficient.

Acrylic rubber is used as a material excellent in oil resistance, heat resistance and ozone resistance. However, this rubber is poor in gasoline resistance, gasohol resistance and sour gasoline resistance and is consequently inappropriate as a material required to be used in the surround of recent automobile engines. Hence, its improvement is in need.

As a means for the improvement of such an acrylic rubber, there has been proposed, for example, a resin composition comprising a mixture of an acrylic rubber and a vinylidene fluoride rubber. Such a composition, however, gives only a small effect on the improvement of gasoline resistance, gasohol resistance and sour gasoline resistance.

The present inventors have made an extensive study in order to develop a rubber material which is excellent in gasoline resistance, gasohol resistance, sour gasoline resistance and sour gasohol resistance and further has heat resistance. As a result, it has been found that a vulcanizable rubber composition comprising, as essential components, (I) a vinylidene fluoride resin and (II) at least one rubber selected from acrylic rubbers, $\alpha,\beta$-unsaturated nitrile-conjugated diene copolymer rubbers and hydrides of the $\alpha,\beta$-unsaturated nitrile-conjugated diene copolymer rubbers excels not only in heat resistance, gasoline resistance and sour gasoline resistance but also in gasohol resistance and sour gasohol resistance which are new requirements for rubber materials and further has a good tensile strength, elongation and balance between gasoline resistance and low-temperature resistance.

According to this invention, there is provided a vulcanizable rubber composition comprising (1) 100 parts by weight of a polymer composition comprising (I) a vinylidene fluoride resin,
(II) at least one rubber selected from the group consisting of acrylic rubbers, $\alpha,\beta$-unsaturated nitrile-conjugated diene copolymer rubbers and hydrides of $\alpha,\beta$-unsaturated nitrile-conjugated diene copolymer rubbers, said acrylic rubber consisting of (A) 30 to 99.9% by weight of an alkyl acrylate and/or an alkoxy-substituted alkyl acrylate, (B) 0.1 to 10% by weight of a crosslinkable monomer and (C) 0 to 70% by weight of another ethylenically unsaturated compound copolymerizable with (A) and (B) (the sum of (A), (B) and (C) is 100% by weight), and said $\alpha,\beta$-unsaturated nitrile-conjugated diene copolymer rubber consisting of (D) 10 to 60% by weight of an $\alpha,\beta$-unsaturated nitrile, (E) 15 to 90% by weight of a conjugated diene and (F) 0 to 75% by weight of another ethylenically unsaturated compound copolymerizable with (D) and (E) (the sum of (D), (E) and (F) is 100% by weight), and
(III) another blendable polymer, wherein the weight ratio of (I)/[(II)+(III)] is 5/95 to 60/40 and the weight ratio of (II)/(III) is 100/0 to 50/50, and (2) 0 to 40 parts by weight of a plasticizer, as well as applications of said vulcanizable rubber composition.

The vinylidene fluoride resin used in this invention is a poly(vinylidene fluoride) or a copolymer of vinylidene fluoride and at least one compound selected from hexafluoropropene, pentafluoropropene, trifluoroethylene, trifluorochloroethylene, tetrafluoroethylene, vinyl fluoride, perfluoro(methyl vinyl ether), perfluoro(propyl vinyl ether), vinyl acetate, ethylene, propylene, butadiene, styrene, and acrylic ester and the like. The content of vinylidene fluoride in the vinylidene fluoride resin is 90 mole % or more, preferably 95 mole % or more. A vinyldiene fluoride copolymer having a vinylidene fluoride content of less than 90 mole % is undesirable in respect of gasoline resistance, gasohol resistance, sour gasoline resistance and sour gasohol resistance. When the vinylidene fluoride polymer is a vinylidene fluoride elastomer, the gasoline resistance and gasohol resistance of the rubber composition are not desirable. The polymerization degree of the vinylidene fluoride resin is preferably 100 to 100,000, though it is not critical.

The acrylic rubber used in this invention consists of the above-mentioned components (A), (B) and (C). The alkyl acrylate as the component (A) is represented by the general formula (i):

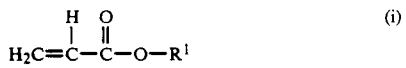

(i)

wherein $R^1$ is an alkyl group of 1 to 18 carbon atoms, and includes, for example, methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate and n-octadecyl acrylate. Particularly preferable are methyl acrylate, ethyl acrylate, n-propyl acrylate and n-butyl acrylate.

The alkoxy-substituted alkyl acrylate as the component (A) is represented by the general formula (ii):

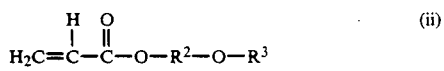

(ii)

wherein $R^2$ is an alkylene group of 1 to 2 carbon atoms and $R^3$ is an alkyl group of 1 to 12 carbon atoms, and include, for example, 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate, 2-(n-butoxy)propyl acrylate and the like. Preferable are 2-methoxyethyl acrylate and 2-ethoxyethyl acrylate. Particularly preferable is 2-methoxyethyl acrylate.

The crosslinkable monomer as the component (B) is a monomer which can introduce a crosslinked structure into the copolymer formed by copolymerization, and includes, for example, a diene compound, a (meth)acrylic ester containing a dihydrodicyclopentadienyl group, an ethylenically unsaturated compound containing an epoxy group, an ethylenically unsaturated compound containing an active halogen atom, an ethylenically unsaturated compound containing a carboxyl group and an ethylenically unsaturated compound containing an active hydrogen atom.

The diene compound includes non-conjugated dienes such as alkylidene norbornenes, alkenyl norbornenes, dicyclopentadiene, methylcyclopentadiene or its dimer, and the like; and conjugated dienes such as butadiene, isoprene and the like. Preferable is a non-conjugated diene selected from the group consisting of an alkylidene norbornene, an alkenyl norbornene, dicyclopentadiene, methylcyclopentadiene and its dimer.

The (meth)acrylic ester containing a dihydrodicyclopentadienyl group is preferably dihydrodicyclopentadienyl (meth)acrylate or dihydrodicyclopentadienyloxyethyl (meth)acrylate.

The ethylenically unsaturated compound containing an epoxy group is preferably allyl glycidyl ether, glycidyl methacrylate or a glycidyl acrylate.

Specific examples of the ethylenically unsaturated compound containing an active halogen atom include vinylbenzyl chloride, vinylbenzyl bromide, 2-chloroethyl vinyl ether, vinyl chloroacetate, vinyl chloropropionate, allyl chloroacetate, allyl chloropropionate, 2-chloroethyl acrylate, 2-chloroethyl methacrylate, chloromethyl vinyl ketone, 2-chloroacetoxymethyl-5-norbornene, etc. Preferable among them are vinyl chloroacetate, 2-chloroethyl vinyl ether, vinylbenzyl chloride, 2-chloroethyl methacrylate and 2-chloroethyl acrylate.

Specific examples of the ethylenically unsaturated compound containing a carboxyl group include acrylic acid, methacrylic acid, crotonic acid, 2-pentenoic acid, maleic acid, fumaric acid, itaconic acid, etc.

The ethylenically unsaturated compound containing an active hydrogen atom includes vinyl amides such as acrylamide, methacrylamide, N-methylolacrylamide and the like; allyl cyanoacetate; etc.

Another ethylenically unsaturated compound, may be varied depending upon requirement and examples thereof include carboxyl group-containing compounds such as acrylic acid, methacrylic acid, crotonic acid, 2-pentenoic acid, maleic acid, fumaric acid, itaconic acid and the like; (meth)acrylic acid esters containing fluorine atoms such as 1,1-dihydroperfluoroethyl (meth)acrylate, 1,1-dihydroperfluoropropyl (meth)acrylate, 1,1,5-trihydroperfluorohexyl (meth)acrylate, 1,1,2,2-tetrahydroperfluoropropyl (meth)acrylate, 1,1,7-trihydroperfluoroheptyl (meth)acrylate, 1,1-dihydroperfluorooctyl (meth)acrylate, 1,1-dihydroperfluorodecyl (meth)acrylate and the like; hydroxyl group-containing compounds such as 1-hydroxypropyl (meth)acrylate, 2-hydroxypropyl (meth)acrylate, hydroxyethyl (meth)acrylate and the like; tertiary amino group-containing monomers such as diethylaminoethyl (meth)acrylate, dibutylaminoethyl (meth)acrylate and the like; methacrylates such as methyl methacrylate, octyl methacrylate and the like; alkyl vinyl ketones such as methyl vinyl ketone and the like; vinyl alkyl ethers such as vinyl ethyl ether and the like; allyl alkyl ethers such as allyl methyl ether and the like; vinyl aromatic compounds such as styrene, α-methylstyrene, chlorostyrene, vinyltoluene and the like; vinylnitriles such as acrylonitrile, methacrylonitrile and the like; ethylene; propylene; vinyl chloride; vinylidene chloride; vinyl fluoride; vinylidene fluoride; vinyl acetate; alkyl fumarates; and the like. Of these, acrylonitrile, ethylene and vinyl acetate are preferred. Acrylonitrile is particularly preferred.

A preferable combination of the component (A) and the component (C) is such that the component (A) (an alkyl acrylate and/or an alkoxy-substituted alkyl acrylate) is at least one compound selected from the group consisting of methyl methacrylate, ethyl acrylate and methoxyethyl acrylate and the component (C) (another ethylenically unsaturated compound) is acrylonitrile.

The proportions of the components (A), (B) and (C) in the acrylic rubber used in this invention are such that the component (A) is 30 to 99.9% by weight, the component (B) is 0.1 to 10% by weight and the component (C) is 0 to 70% by weight, the sum of (A), (B) and (C) being 100% by weight.

When the proportion of the component (A) is less than 30% by weight, the acrylic rubber is inferior in physical properties such as tensile strength and elongation. Therefore, such a proportion is undesirable. The proportion is preferably 50% by weight or more, and more preferably 70% by weight or more.

When the proportion of the component (B) is less than 0.1% by weight, the acrylic rubber requires a long time for crosslinking, while when the proportion exceeds 10% by weight, the acrylic rubber becomes hard and the elongation of the crosslinked rubber becomes low, and hence, such proportions are undesirable. A preferable proportion is 1 to 7% by weight and a more preferable proportion is 2 to 5% by weight.

When the proportion of the component (C) exceeds 70% by weight, the proportion of the component (A) becomes too low, and hence, such a proportion is undesirable.

The acrylic rubber can be produced by an emulsion polymerization method using a conventional radical polymerization catalyst. The Mooney viscosity of the acrylic rubber is preferably 20 to 120 in terms of $ML_{1+4}(100°\ C.)$, though not critical. For improving the resistance to solvent-cracking, a mixture of 100 to 60% by weight of the acrylic rubber having a Mooney viscosity ($ML_{1+4}(100°\ C.)$) of 20 to 120 and 0 to 40% by weight of the acryli rubber having a number average molecular weight of 500 to 10,000 is preferred. When the molecular weight is less than 500, the polymer is easily extracted with a solvent and when the molecular weight is exceeds 10,000, the improvement effect on resistance to solvent-cracking is low.

The $\alpha,\beta$-unsaturated nitrile-conjugated diene copolymer rubber (hereinafter referred to as the nitrile rubber in some cases) used in this invention consists of the above-mentioned components (D), (E) and (F). The $\alpha,\beta$-unsaturated nitrile as the component (D) includes specifically acrylonitrile, $\alpha$-chloroacrylonitrile, $\alpha$-fluoroacrylonitrile, methacrylonitrile, ethacrylonitrile and the like. Of these, acrylonitrile is particularly preferred.

The conjugate diene as the component (E) includes butadiene-1,3, 2-chlorobutadiene-1,3, 2-methylbutadiene-1,3 and the like. Of these, butadiene-1,3 is particularly preferred.

The component (F) may be selected from various compounds depending upon requirement, and its examples include specifically alkyl acrylates such as methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate and the like; alkoxy-substituted alkyl acrylates such as 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate, 2-(n-butoxy)propyl acrylate and the like; alkyl methacrylates such as methyl methacrylate, octyl methacrylate and the like; alkyl vinyl ketones such as methyl vinyl ketone and the like; vinyl alkyl ethers and allyl alkyl ethers such as vinyl ethyl ether, allyl methyl ether and the like; vinyl aromatic compounds such as styrene, $\alpha$-methylstyrene, chlorostyrene, vinyltoluene and the like; carboxyl group-containing compounds such as acrylic acid, methacrylic acid, crotonic acid, 2-pentenoic acid, maleic acid, fumaric acid, itaconic acid and the like; acrylic acid esters containing fluorine atoms such as 1,1-dihydroperfluoroethyl (meth)acrylate, 1,1-dihydroperfluoropropyl (meth)acrylate, 1,1,5-trihydroperfluorohexyl (meth)acrylate, 1,1,2,2-tetrahydroperfluoropropyl (meth)acrylate, 1,1,7-trihydroperfluoroheptyl (meth)acrylate, 1,1-dihydroperfluorooctyl (meth)acrylate, 1,1-dihydroperfluorodecyl (meth)acrylate and the like; epoxy group-containing compounds such as allyl glycidyl ether, glycidyl methacrylate, glycidyl acrylate and the like; compounds containing an active halogen atom such as vinylbenzyl chloride, vinylbenzyl bromide, 2-chloroethyl vinyl ether, vinyl chloroacetate, vinyl chloropropionate, allyl chloroacetate, allyl chloropropionate, 2-chloroethyl acrylate, 2-chloroethyl methacrylate, chloromethyl vinyl ketone, 2-chloroacetoxymethyl-5-norbornene and the like; hydroxyl group-containing compounds such as 1-hydroxypropyl (meth)acrylate, 2-hydroxypropyl (meth)acrylate, hydroxyethyl (meth)acrylate and the like; monomers containing a tertiary amino group such as dimethylaminoethyl (meth)acrylate, diethylaminoethyl (meth)acrylate, dibutylaminoethyl (meth)acrylate and the like; vinylamides such as acrylamide, methacrylamide, N-methylolacrylamide and the like; ethylene; propylene; vinyl chloride; vinylidene chloride; vinyl fluoride; vinylidene fluoride; vinyl acetate; alkyl fumarates; and the like. Of these, (meth)acrylic acid esters are particularly preferred.

The proportions of the components (D), (E) and (F) in the $\alpha,\beta$-unsaturated nitrile-conjugated diene copolymer rubber of this invention are such that the component (D) is 10 to 60% by weight, the component (E) is 15 to 90% by weight and the component (F) is 0 to 75% by weight, the sum of (D), (E) and (F) being 100% by weight.

When the component (D) is less than 10% by weight, the rubber composition of this invention has low oil resistance, and hence, such a proportion is undesirable. When the proportion of the component (D) exceeds 60% by weight, the rubber composition has a low processability, and hence, such a proportion is also undesirable. A preferable proportion is 20 to 50% by weight. When the proportion of the component (E) is less than 15% by weight, the low-temperature resistance of the rubber composition becomes low, and hence, such a proportion is undesirable. The proportion is preferably 30% by weight or more, and more preferably 50% by weight or more.

When the proportion of the component (F) exceeds 65% by weight, the proportions of the components (D) and (E) become too low. Therefore, such a proportion is undersirable. A preferable proportion is 25% by weight or less.

The $\alpha, \beta$-unsaturated nitrile-conjugated diene copolymer rubber can be produced according to an emulsion polymerization method using a conventional radical polymerization catalyst.

In the hydride of an $\alpha, \beta$-unsaturated nitrile-conjugated diene copolymer rubber, the conjugated diene unit in the copolymer chain is hydrogenated in a proportion of 10% or more, preferably 30% or more, particularly preferably 50% or more.

The hydride can be obtained by subjecting to hydrogenation the diene unit of the nitrile rubber (an $\alpha, \beta$-unsaturated nitrile-conjugated diene copolymer rubber) produced in accordance with an emulsion polymerization method or a solution polymerization method such as described in Japanese Patent Publication No. 39275/70, Japanese Patent Application Kokai (Laid-Open) No. 71,681/75, UK Patent No. 2,070,023 or the like.

The rubber composition of this invention containing the hydride of the nitrile rubber is superior to the rubber composition containing the nitrile rubber in respect of low-temperature resistance, heat resistance, gasoline resistance, gashol resistance, sour gasoline resistance and sour gasohol resistance. The Mooney viscosity of the $\alpha, \beta$-unsaturated nitrile-conjugated diene copolymer rubber is preferably 20 to 150 in terms of $ML_{1+4}(100°\ C.)$, though it is not critical. For improving the resistance to solvent-cracking, a mixture of 100 to 60% by weight of the nitrile rubber (and/or its hydride) having a Mooney viscosity ($ML_{1+4}(100°\text{ C.})$) of 20 to 150 and the nitrile rubber (and/or its hydride) having a number average molecular weight of 500 to 10,000 is preferred. When the number average molecular weight is less than 500, the polymer is easily extracted with a solvent. When the molecular weight exceeds 10,000, the improvement effect on resistance to solvent-cracking is low.

When the acrylic rubber is used as the rubber (II), the rubber composition is superior in heat resistance, ozone resistance, sour gasoline resistance and sour gasohol resistance to that obtained when the nitrile rubber or its hydride is used as the rubber (II).

Another blendable polymer (III) used in this invention may be liquid or solid at room temperature. It includes rubbers such as chloroprene rubber, hydrin rubber, chlorosulfonated polyethylene, chlorinated polyethylene, silicone rubber, ethylene-propylene-(diene) rubber, styrenebutadiene rubber, polybutadiene rubber, butyl rubber, isoprene rubber, natural rubber, fluororubber and the like; thermosetting resins such as phenolic resin, melamine resin, urea resin, unsaturated polyester resin, epoxy resin, allyl resin, silicone resin and the like; polyethylene; poly-(vinyl chloride); polypropylene; polystyrene; ABS resin; acrylic resin; polyamide resin; polyester resins; polycarbonate resins; polyether resins; polyacetal resins; etc. These polymers may be used alone or in admixture of two or more. Of these, poly(vinyl chloride), fluororubber, epichlorohydrin rubber and chlorosulfonated polyethylene are particularly preferred.

In this invention, the weight ratio of (I) the vinylidene fluoride resin to the sum of (II) at least one rubber selected from the acrylic rubber, the $\alpha,\beta$-unsaturated nitrile-conjugated diene copolymer rubber and the hydride of $\alpha, \beta$-unsaturated nitrile-conjugated diene copolymer rubber and (III) another blendable polymer, namely, the weight ratio of (I)/[(II)+(III)], is 5/95 to 60/40, preferably 10/90 to 50/50. When the vinylidene fluoride resin is less than 5 parts by weight, the rubber composition of this invention shows no improvement effect on gasohol resistance, sour gasohol resistance and heat resistance. A preferable proportion of the vinylidene fluoride resin is 10 parts by weight or more. As the amount of the vinylidene fluoride resin in the rubber composition increases, the processability of the rubber composition becomes lower and the cost of the composition becomes higher. Accordingly, the amount of the vinylidene fluoride resin has an upper limit and is ordinarily 60 parts by weight or less, preferably 50 parts by weight or less, particularly preferably 40 parts by weight or less.

The weight ratio of (I)/[(II)+(III)] in the rubber composition of this invention can be appropriately varied within the above-mentioned range depending upon the applications and the performance required.

In this invention, the weight ratio of (II) at least one rubber to (III) another blendable polymer, namely, the weight ratio of (II)/(III), is 100/0 to 50/50, preferably 100/0 to 70/30.

The weight ratio of (II)/(III) can be appropriately varied within the above range depending upon the applications and the performance required. In order to improve the processability of the rubber composition, it is preferable to use a vinyl chloride resin or a phenolic resin as the component (III). When the ratio of the component (III) blended exceeds 50%, the amount of the component (II) becomes too small and the effectiveness of this invention cannot be obtained.

The mixing method in preparing the rubber composition of this invention is not critical. For Example, the following methods can be used:

(1) A method wherein (I) a vinylidene fluoride resin, (II) at least one rubber and (III) another blendable polymer are mixed using a mixer such as a roll, a Banbury mixer, an intermixer or the like.

(2) A method wherein (I) a vinylidene fluoride resin, (II) at least one rubber and (III) another blendable polymer are mixed in the form of a latex or a suspension and then subjected to a coagulation treatment to cause coprecipitation.

(3) A combination of the above methods (1) and (2).

In mixing with a mixer such as a roll, a Banbury mixer, an intermixer or the like, it is necessary to employ an appropriate mixing temperature depending upon the type of plasticizers used.

When a poly(ether ester) having a poor compatibility with the vinylidene fluoride (I) is used as a plasticizer, the mixing can be conducted, for example, in such a way that carbon black is premixed with the rubber (II) and then the vinylidene fluoride resin (I) is mixed therewith at high temperatures, specifically at 150° to 250° C., preferably at 150° to 200° C. When the mixing temperature exceeds 250° C., there occurs a deterioration of rubber. Therefore, such high temperatures are undesirable. When the mixing temperature is lower than 150° C., mixing is insufficient and the resulting composition has low physical properties.

When a phosphoric acid derivative having a good compatibility with the vinylidene fluoride (I) is used as a plasticizer, the mixing can be conducted at lower temperatures of up to 150° C.

Into the vulcanizable rubber composition of this invention can be incorporated conventional chemicals such as reinforcing agents, fillers, plasticizers, releasing agents, softeners, stabilizers and the like.

As the reinforcing agent and the filler, there can be used not only carbon black but also conventional white fillers such as calcium carbonate, magnesium carbonate, an aluminium silicate (e.g. kaolin clay, pyrophylite clay or the like), a magnesium silicate (e.g. talc, mica or the like), a calcium silicate, aluminum hydroxide, silicic acid, barium sulfate and the like.

The incorporation of a plasticizer is desirable from the viewpoint of improvement of low-temperature resistance. The plasticizer includes phthalic acid derivatives [e.g. diethyl phthalate, di-(2-ethylhexyl) phthalate, dibutyl phthalate, di-n-octyl phthalate, dimethylcyclohexyl phthalate and the like]; isophthalic acid derivatives (e.g. diisooctyl isophthalate and the like); tetrahydrophthalic acid derivatives [e.g. di-(2-ethylhexyl)tetrahydrophthalate and the like]; adipic acid derivatives [e.g. di-(2-ethylhexyl) adipate, di-(butoxyethoxyethyl) adipate, butyl diglycol adipate and the like]; azelaic acid derivatives [e.g. di-(2-ethylhexyl) azelate and the like]; sebacic acid derivatives [e.g. di-(2-ethylhexyl) sebacate, di-n-butyl sebacate and the like]; fatty acid derivatives (e.g. diethylene glycol monolaurate and the like); phosphoric acid derivatives [e.g. tributoxyethyl phosphate, tri-(2-ethylhexyl) phosphate, triphenyl phosphate and the like]; glycol derivatives [e.g. dibutyl methylene-bis(-thioglycolate) and the like]; glycerine derivatives; epoxy derivatives and the like, and in addition, polymeric plasticizers [e.g. polyesters, polyethers, poly(ether esters) and the like], etc.

Among these plasticizers, preferable are adipic acid derivatives, phosphoric acid derivatives and polymeric plasticizers including polyesters, polyethers and poly(ether esters). Particularly preferable are di-(butoxyethoxyethyl) adipate, tributoxyethyl phosphate and a poly(ether ester).

These additives are added to the rubber (II), after which the resulting mixture and the vinylidene fluoride resin (I) are mixed in accordance with one of the mixing methods (1), (2) and (3) mentioned previously. Alternatively, the rubber (II) and the vinyldiene fluoride resin (I) are mixed and then the additives are added.

The vulcanizable rubber composition of this invention can easily be converted to a crosslinked product in accordance with a conventional crosslinking method.

As the crosslinking agent, an appropriate compound is selected depending upon the type of the functional group to be utilized in crosslinking introduced into the rubber (II).

For example, when a diene compound or a (meth)acrylic acid ester cotaining a dihydrodicyclopentadienyl group is used in copolymerization to introduce C=C double bonds into the rubber (II), there can preferably be used a vulcanizing agent such as sulfur, a thiuram compound or the like, as well as a crosslinking agent used in conventional diene type rubbers (e.g. styrene-butadiene rubber, isoprene rubber, butadiene-acrylonitrile rubber) such as an organic peroxide.

When an ethylenically unsaturated compound containing an epoxy group is used in copolymerization to introduce the epoxy group into the rubber (II), there can be used, for example, a combination of a sulfur compound with a polyaminocarbamate, an ammonium organic carboxylate, a dithiocarbamic acid salt or an alkali metal organic carboxylate.

When an ethylenically unsaturated compound containing an active halogen atom is used in copolymerization to introduce the active halogen atom into the rubber (II), there can preferably be used, for example, a combination of a sulfur compound with a polyaminocarbamate, an ammonium organic carboxylate or an alkali metal organic carboxylate.

When an ethylenically unsaturated compound containing a carboxyl group is used in coplymerization to introduce the carboxyl group into the rubber (II), there can preferably be used an organic amine compound, a multivalent metal salt, etc.

The composition of this invention excels not only in gasoline resistance, sour gasoline resistance, ozone resistance and heat resistance but also in gasohol resistance and sour gasohol resistance which are new required performances. Also, the composition is good in tensile strength, elongation and low-temperature resistance. Therefore, the composition can be used in fuel hoses for automobiles; various hoses used in contact with a fuel oil, a hydraulic oil, a lubricating oil, etc.; diaphragms; various sealing materials such as a gasket, an O-ring, an oil seal and the like; and rolls, transfer belts, conveyor belts, timing belts, chain tensioners, oil dumpers, etc. requiring oil resistance and solvent resistance, used in iron making, spinning, printing, paper making, dyeing, etc.

The composition of this invention can preferably be used as a rubber material for fuel hoses for automobiles because it is excellent particularly in sour gasoline resistance and sour gasohol resistance.

The composition of this invention can preferably be used as a material in the fluid-contacting surface of diaphragms.

A rubber layer consisting of the composition of this invention can be used as a layer of a rubber laminate to enable layers to be strongly bonded to each other in the laminate.

A hose having such a rubber laminate structure in which the inner tube layer is formed of the composition of this invention can appropriately be used as a fuel hose.

The rubbers to be used in the rubber layer to be laminated to a rubber layer composed of the composition of this invention include butadiene-acrylonitrile rubber, styrene-butadiene rubber, fluororubber, polychloroprene, acrylic rubbers, ethylene-propylene-termonomer copolymers (EPT), chlorinated polyethylene, chlorosulfonated polyethylene, silicone rubber, butyl rubber, epichlorohydrin rubber and the like. Particularly preferable are epichlorohydrin rubber, fluororubber, chlorosulfonated polyethylene, polychloroprene and butadiene-acrylonitrile rubber.

Each rubber layer of the above rubber laminate may contain an oxide or hydroxide of a metal of Groups II to IV of the Periodic Table. Said oxide and hydroxide include magnesium oxide, aluminum oxide, zinc oxide, calcium oxide, lead (II, IV) oxide, silicon dioxide, etc. and hydroxides of these metals. Addition of the oxide or hydroxide enhances the adhesion among the rubber layers. Magnesium oxide, calcium hydroxide, aluminum hydroxide and lead (II) oxide are particularly preferred. The amount of the oxide or hydroxide used is 5 to 30 parts by weight per 100 parts by weight of rubber (PHR).

Incorporation of an epoxy resin, a hardening agent and a basic substance into each rubber layer of the above rubber laminate can bring about sufficient vulcanization of each layer and strong adhesion among the layers. The hardening agent includes maleic anhydride, phthalic anhydride, p-aminodiphenylamine, 2-methylimidazole, etc. The basic substance includes triethylamine, tetrabutylammonium chloride, etc. The rubber laminate of this invention can alternatively be produced by laminating vulcanized rubber layers to one another.

BRIEF DESCRIPTION OF THE DRAWINGS

This invention is further explained referring to the accomapnying drawings. In the drawings.

In FIGS. 1 and 2, 1 is a diaphragm body made from a rubber composition of this invention; 2 is a substrate cloth; and 3 is a screw for fixing. In FIG. 3, 4 is an inner tube layer; 5 is a braided fabric-reinforcing layer; and 6 is an outer tube layer.

A rubber hose in which the inner layer is made from the rubber composition of this invention and the outer layer is made from another rubber can be produced in accordance with a conventional method. FIG. 3 shows a perspective view of a rubber hose made from a rubber laminate of this invention, wherein 4 is an inner layer made from the rubber composition of this invention, 5 is a braided fabric-reinforcing layer and 6 is an outer layer made from another rubber.

The outside diameter and inside diameter of the above rubber hose, the wall thickness of the inner tube layer, the wall thickness of the outer tube layer, etc. can appropriately be determined depending upon the properties of a fluid which passes through the inside of the hose, the use condition of the hose, etc.

Figure 3:
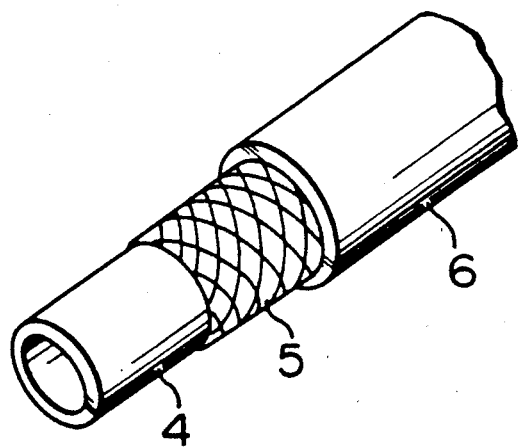
FIG. 3 is a perspective view of one example of a rubber hose of this invention.

The rubber hose of this invention is not restricted to a three layer structure as shown in FIG. 3 and includes other two or more layer structures using, as the inner tube layer, a rubber layer made from the rubber composition of this invention.

The rubber adhering to the inner tube layer includes butadiene-acrylonitrile rubber, styrene-butadiene rubber, fluororubber, polychloroprene, acrylic rubbers, ethylene-propylene-termonomer copolymers (EPT), chlorinated polyethylene, chlorosulfonated polyethylene, silicone rubber, butyl rubber, epichlorohydrin rubber and the like. Particularly preferable are epichlorohydrin rubber, fluororubber, chlorosulfonated rubber, polychloropresne and butadiene-acrylonitrile rubber.

The vulcanizable rubber composition of this invention excels in gasoline resistance, sour gasoline resistance, gasohol resistance, sour gasohol resistance and heat resistance and further in tensile strength, elongation and balance between gasoline resistance and low-temperature resistance.

This invention will be explained more specifically below referring to Examples and Comparative Examples. However, this invention is not restricted to the Examples.

EXAMPLES 1-1 TO 1-8 AND COMPARATIVE EXAMPLES 1-1 TO 1-4

On each sample having the blend composition shown in the upper section of Table 1-2 consisting of a rubber (II) and a vinylidene fluoride resin (I), compounding was effected in accordance with the respective compounding formulations shown in Table 1-1 with a Banbury mixer. The resulting compounds were subjected to press-curing under the respective conditions shown in the lower section of Table 1-1.

The resulting crosslinked rubbers were subjected to measurement of characteristics in accordance with JIS K 6301. These rubbers were also subjected to measurement of sour gasoline resistance and sour gasohol resistance in accordance with the following test methods:

TEST METHOD FOR SOUR GASOLINE RESISTANCE

A test specimen was immersed at 40° C. for 72 hours in a solution obtained by dissolving 2.5 g of lauroyl peroxide in 97.5 g of Fuel C. (a mixed solvent consisting of equal volumes of isooctane and toluene). This one cycle procedure was repeated n times (n cycles). After each cycle, the test specimen was taken out, dried at 100° C. for 15 hours under reduced pressure and bent at an angle of 180° to observe formation of cracks.

Test Method For Sour Gasohol Resistance

This resistance was measured by the same method as in the case of sour gasoline resistance, except that the Fuel C was replaced by a mixed solvent consisting of 80 parts by volume of Fuel C and 20 parts by volume of ethanol.

The measurement results are shown in the lower section of Table 1-2.

As is obvious from Table 1-2, each of the rubber compositions of this invention can provide a vulcanized rubber composition excellent not only in gasoline resistance, gasohol resistance, sour gasoline resistance, sour gasohol resistance, ozone resistance and heat resistance but also in tensile strength, elongation and balance between gasoline resistance and low-temperature resistance.

TABLE 1-1

| Compounding formulation (parts by weight) | a | b | c | d | e |
|---|---|---|---|---|---|
| Polymer | 100.0 | 100.0 | 100.0 | 100.0 | 100.0 |
| Zinc oxide | | | | | |
| Stearic acid | 1.0 | 1.0 | 1.0 | 1.0 | 1.0 |
| HAF carbon black*[1] | 20.0 | 20.0 | 20.0 | 60.0 | 20.0 |
| Processing adjuvant TE-80*[2] | 1.0 | 1.0 | 1.0 | 1.0 | |
| RS-700*[3] | 20.0 | 10.0 | 10.0 | | |
| Tributoxyethyl phosphate | | | | | 10.0 |
| Accelerator TT*[4] | | | | | |
| Accelerator TRA*[5] | | | 0.5 | | |
| Accelerator EUR*[6] | | | 1.0 | | |
| Sulfur | | | | | |
| Ammonium benzoate | 2.0 | 2.0 | | 2.0 | 2.0 |
| Potassium stearate | | | 3.0 | | |
| Conditions for press-curing | 165° C. × 30 min | 165° C. × 30 min | 175° C. × 20 min | 165° C. × 30 min | 170° C. × 30 min |

Note:
*[1]High abrasion furnace black
*[2]Metal salt of a fatty acid, manufactured by Technical Processing Co.
*[3]A plasticizer of poly(ether ester) type, manufactured by Adeka Argus Chemical Co., Ltd.
*[4]Tetramethylthiuram disulfide
*[5]Dipentamethylenethiuram hexasulfide
*[6]1,3-Diethylthiourea

TABLE 1-2

| | Example | | | | | | | | Comparative Example | | | |
|---|---|---|---|---|---|---|---|---|---|---|---|---|
| | 1-1 | 1-2 | 1-3 | 1-4 | 1-5 | 1-6 | 1-7 | 1-8 | 1-1 | 1-2 | 1-3 | 1-4 |
| Blend composition | | | | | | | | | | | | |
| Vinylidene fluoride resin (I) | 50*[2] | 30*[1] | 30*[1] | 30*[1] | 30*[1] | 30*[1] | 30*[1] | 30*[1] | 0 | 3*[1] | 30*[3] | 70*[1] |

TABLE 1-2-continued

| | Example | | | | | | | | Comparative Example | | | |
|---|---|---|---|---|---|---|---|---|---|---|---|---|
| | 1-1 | 1-2 | 1-3 | 1-4 | 1-5 | 1-6 | 1-7 | 1-8 | 1-1 | 1-2 | 1-3 | 1-4 |
| (parts by weight) | | | | | | | | | | | | |
| Rubber (II) (parts by weight) | 50 | 70 | 70 | 70 | 70 | 70 | 70 | 70 | 100 | 97 | 70 | 30 |
| Component (A) | | | | | | | | | | | | |
| Methyl acrylate (% by wt.) | | | | | 47 | 57 | | | | | | |
| Ethyl acrylate (% by wt.) | 97 | 7 | 27 | 37 | | | | 42 | 97 | 97 | 97 | 97 |
| n-Butyl acrylate (% by wt.) | | 10 | | | | | | | | | | |
| Methoxyethyl acrylate (% by wt.) | | 70 | 60 | 40 | 40 | 40 | 67 | 50 | | | | |
| Component (B) | | | | | | | | | | | | |
| Ethylidenenorbornene (% by wt.) | | | | | | | | | | | | |
| Allyl glycidyl ether (% by wt.) | | 3 | 3 | 3 | 3 | 3 | 3 | 3 | 3 | 3 | | 3 |
| Vinyl chloroacetate (% by wt.) | 3 | | | | | | | | | | 3 | |
| Component (C) | | | | | | | | | | | | |
| Acrylonitrile (% by wt.) | | 10 | 10 | 20 | 10 | | | 5 | | | | |
| Vinyl acetate (% by wt.) | | | | | | | 25 | | | | | |
| Ethylene (% by wt.) | | | | | | | 10 | | | | | |
| Compounding formulation (Refer to Table 1-1) | c | b | b | b | b | b | b | e | d | b | d | b |
| Properties of crosslinked rubber | | | | | | | | | | | | |
| Tensile strength (kg/cm$^2$) | 195 | 145 | 157 | 175 | 178 | 173 | 155 | 170 | 170 | 135 | 121 | 245 |
| Elongation (%) | 450 | 330 | 540 | 350 | 320 | 370 | 300 | 580 | 320 | 380 | 301 | 65 |
| Hardness (JIS-A) | 76 | 69 | 75 | 75 | 73 | 72 | 75 | 80 | 74 | 62 | 76 | 93 |
| Gasoline resistance (after immersion at 40° C. for 48 hr in Fuel C) | | | | | | | | | | | | |
| ΔV (%) | +22 | +27 | +18 | +15 | +14 | +21 | +35 | +20 | +120 | +75 | +85 | +11 |
| Gasohol resistance (after immersion at 40° C. for 48 hr in a solution consisting of 80 vol. % of Fuel C and 20 vol. % of ethanol) | | | | | | | | | | | | |
| ΔV (%) | +47 | +53 | +47 | +39 | +35 | +43 | +65 | +53 | +260 | +165 | +180 | +15 |
| Sour gasoline resistance (after immersion at 40° C. for 72 hr by n cycles in Fuel C containing 2.5 wt. % of lauroyl peroxide) | | | | | | | | | | | | |
| n = 3 (3 cycles) | NC*4 | NC | NC | NC | NC | NC | NC | NC | Softened | Softened | Softened | NC |
| n = 10 (10 cycles) | NC | NC | NC | NC | NC | NC | NC | NC | Softened | Softened | Softened | NC |
| Sour gasohol resistance (after immersion at 40° C. for 72 hr by n cycles in a solution consisting of 80 vol. % of fuel C containing 2.5 wt. of lauroyl peroxide and 20 vol. % of ethanol) | | | | | | | | | | | | |
| n = 3 (3 cycles) | NC | NC | NC | NC | NC | NC | NC | NC | Softened | Softened | Softened | NC |
| n = 6 (6 cycles) | NC | NC | NC | NC | NC | NC | NC | NC | Softened | Softened | Softened | NC |
| n = 10 (10 cycles) | NC | NC | NC | NC | NC | NC | NC | NC | Softened | Softened | Softened | NC |
| Heat-deterioration resistance (aged at 150° C. for 72 hr by heating with air) | | | | | | | | | | | | |
| Change of tensile strength (%) | +2 | +3 | −3 | +4 | +4 | +1 | −3 | +5 | +7 | +6 | +2 | +2 |
| Change of elongation (%) | −20 | −52 | −43 | −40 | −35 | −25 | −25 | −30 | −57 | −53 | −45 | −3 |
| Change of hardness (JIS-A) (point) | +3 | +5 | +4 | +4 | +3 | +2 | +1 | +3 | +5 | +4 | +4 | +2 |
| Ozone resistance (static) (80 pphm, 40° C., 100% elongation) | | | | | | | | | | | | |
| 24 hr | NC | NC | NC | NC | NC | NC | NC | NC | NC | NC | NC | NC |
| Ozone resistance (dynamic) (80 pphm, 40° C., 0 to 20% elongation) | | | | | | | | | | | | |
| 24 hr | NC | NC | NC | NC | NC | NC | NC | NC | NC | NC | NC | NC |
| 288 hr | NC | NC | NC | NC | NC | NC | NC | NC | NC | NC | NC | NC |
| Low-temperature resistance (Gheman torsion test) | | | | | | | | | | | | |
| T100 (°C.) | −38 | −35 | −33 | −25 | −25 | −29 | −25 | −35 | −11 | −19 | −15 | Unmeasurable |

Note:
*1 A poly(vinylidene fluoride), manufactured by Penwalt Co. JSR KYNAR 731 composed of 100 mole % of vinylidene fluoride.
*2 A copolymer resin composed of 91 mole % of vinylidene fluoride, 4 mole % of hexafluoropropylene and 5 mole % of tetrafluoroethylene.
*3 A copolymer rubber composed of 80 mole % of vinylidene fluoride and 20 mole % of hexafluoropropylene.
*4 NC means no cracking.

EXAMPLES 2-1 TO 2-8 AND COMPARATIVE EXAMPLES 2-1 TO 2-3

On each sample having the blend composition shown in the upper section of Table 2-2 consisting of a rubber (II) and a vinylidene fluoride resin (I), compounding was effected in accordance with the respective compounding formulations shown in Table 2-1 using a Banbury mixer and a roll, by pre-mixing the rubber (II) with the reinforcing agent, filler, plasticizer, releasing agent, etc. with a Banbury mixer and then mixing the resulting mixture with the vinylidene fluoride resin (I) on a roll at 170° C. The resulting blend was cooled to room temperature and the crosslinking agent was added thereto (hereinafter, this is referred to as kneading method (A). The resulting compounds were subjected to press-curing under the respective conditions shown in the lower section of Table 2-1.

The resulting crosslinked rubber compositions were subjected to measurement of sour gasoline resistance and sour gasohol resistance.

The measurement results are shown in the lower section of Table 2-2.

As is obvious from Table 2-2, each of the rubber compositions of this invention can provide a vulcanized rubber composition excellent not only in gasoline resistance, gasohol resistance, sour gasoline resistance, sour gasohol resistance and heat resistance, but also in tensile strength, elongation and balance between gasoline resistance and low-temperature resistance.

TABLE 2-1

| Compounding formulation (parts by wt.) | a | b | c | d |
|---|---|---|---|---|
| Polymer | 100.0 | 100.0 | 100.0 | 100.0 |
| FEF carbon black*[1] | 20.0 | 20.0 | 40.0 | 60.0 |
| Zinc oxide | 5.0 | 5.0 | 5.0 | 5.0 |
| Magnesium oxide | — | — | — | — |
| Stearic acid | 1.0 | 1.0 | 1.0 | 1.0 |
| TP-95*[2] | 10.0 | 20.0 | 10.0 | 10.0 |
| Sulfur | 0.5 | 0.5 | 0.5 | 0.5 |
| Accelerator TT*[3] | 1.5 | 1.5 | 1.5 | 1.5 |
| Accelerator CZ*[4] | 2.0 | 2.0 | 2.0 | 2.0 |
| Vulcanizing agent TAC*[5] | — | — | — | — |
| Peroxide*[6] | 0 | — | — | — |
| Conditions for press-curing | 170° C. × 20 min | 170° C. × 20 min | 170° C. × 20 min | 160° C. × 20 min |

| Compounding formulation (parts by wt.) | e | f | g |
|---|---|---|---|
| Polymer | 100.0 | 100.0 | 100.0 |
| FEF carbon black*[1] | 10.0 | 20.0 | 20.0 |
| Zinc oxide | 5.0 | 2.0 | 5.0 |
| Magnesium oxide | — | 10.0 | — |
| Stearic acid | 1.0 | 1.0 | 1.0 |
| TP-95*[2] | 20.0 | 10.0 | TBXP*[7] 20.0 |
| Sulfur | 0.5 | — | 0.5 |
| Accelerator TT*[3] | 1.5 | — | 1.5 |
| Accelerator CZ*[4] | 2.0 | — | 2.0 |
| Vulcanizing agent TAC*[5] | — | 2.5 | — |
| Peroxide*[6] | — | 7.5 | — |
| Conditions for press-curing | 170° C. × 20 min | 170° C. × 20 min | 170° C. × 20 min |

Note:
*[1]Fast excluding furnace black
*[2]Di(butoxyethoxyethyl) adipate
*[3]Tetramethylthiuram disulfide
*[4]N-cyclohexyl-2-benzothiazolsulfenamide
*[5]Triallyl cyanurate
*[6]Perkadox 14/40 (Kayaku Noury Co., Ltd.)
*[7]Tributoxyethyl phosphate

TABLE 2-2

| | Example | | | | | | | | Comparative Example | | |
|---|---|---|---|---|---|---|---|---|---|---|---|
| | 2-1 | 2-2 | 2-3 | 2-4 | 2-5 | 2-6 | 2-7 | 2-8 | 2-1 | 2-2 | 2-3 |
| Blend composition | | | | | | | | | | | |
| Vinylidene fluoride resin (I) (parts by wt.) | 30*[1] | 50*[2] | 10*[1] | 30*[1] | 30*[1] | 30*[1] | 30*[1] | 25*[1] | — | 65*[1] | (30*[3]) |
| Rubber (II) (parts by wt.) | 70 | 50 | 90 | 70 | 70 | 70 | 70 | 75 | 100 | 35 | 70 |
| Component (A) | | | | | | | | | | | |
| Acrylonitrile (% by wt.) | 50 | 15 | 45 | 40 | 40 | 45 | 30 | 45 | 50 | 35 | 50 |
| Component (B) | | | | | | | | | | | |
| Butadiene-1,3 (% by wt.) | 50 | | 20 | 40 | 50 | 55*[5] | 70*[6] | 55 | 50 | 65 | 50 |
| 2-Methylbutadiene-1,3 (% by wt.) | | 80 | | | | | | | | | |
| Component (C) | | | | | | | | | | | |
| n-Butyl acrylate | | | 30 | | | | | | | | |
| 1,1-Dihydroperfluoroethyl acrylate (% by wt.) | | | | 20 | | | | | | | |
| 2-Hydroxypropyl methacrylate (% by wt.) | | | 5 | | | | | | | | |
| Diethylaminoethyl methacrylate (% by wt.) | | | | | 10 | | | | | | |
| Acrylic acid (% by wt.) | | 5 | | | | | | | | | |
| Compounding formulation (Refer to Table 2-1) | a | b | c | a | a | a | f | g | d | e | a |
| Kneading method | A | A | A | A | A | A | A | A | A | A | A |
| Properties of crosslinked rubber | | | | | | | | | | | |
| Tensile strength (kg/cm²) | 184 | 251 | 145 | 195 | 190 | 306 | 322 | 190 | 220 | 260 | 175 |
| Elongation (%) | 320 | 255 | 230 | 290 | 350 | 555 | 515 | 350 | 330 | 25 | 200 |
| Hardness (JIS-A) | 73 | 71 | 71 | 72 | 73 | 79 | 78 | 74 | 73 | 81 | 62 |
| Gasoline resistance (after immersion at 40° C. for 48 hr in Fuel C) | | | | | | | | | | | |

TABLE 2-2-continued

|  | Example | | | | | | | | Comparative Example | | |
|---|---|---|---|---|---|---|---|---|---|---|---|
|  | 2-1 | 2-2 | 2-3 | 2-4 | 2-5 | 2-6 | 2-7 | 2-8 | 2-1 | 2-2 | 2-3 |
| ΔV (%) Gasohol resistance (after immersion at 40° C. for 48 hr in a solution consisting of 80 vol. % of Fuel C and 20 vol. % of ethanol) | +19 | +29 | +25 | +18 | +21 | +20 | +35 | +22 | +30 | +10 | +26 |
| ΔV (%) Sour gasoline resistance (after immersion at 40° C. for 72 hr by n cycles in Fuel C containing 2.5 wt. % of lauroyl peroxide) | +38 | +48 | +46 | +39 | +48 | +39 | +50 | +41 | +55 | +35 | +48 |
| n = 3 (3 cycles) | NC | NC*4 | NC | NC | NC | NC | NC | NC | Cracks appeared | Impossible to measure | Cracks appeared |
| n = 10 (10 cycles) | NC | NC | NC | NC | NC | NC | NC | NC | Cracks appeared | Impossible to measure | Cracks appeared |
| Sour gasohol resistance (after immersion at 40° C. for 72 hr by n cycles in a solution consisting of 80 vol. % of Fuel C containing 2.5 wt. % of lauroyl peroxide and 20 vol. % of ethanol) | | | | | | | | | | | |
| n = 3 (3 cycles) | NC | NC | NC | NC | NC | NC | NC | NC | Cracks appeared | Impossible to measure | Cracks appeared |
| n = 6 (6 cycles) | NC | NC | NC | NC | NC | NC | NC | NC | Cracks appeared | Impossible to measure | Cracks appeared |
| n = 10 (10 cycles) | NC | Cracks appeared | NC | NC | NC | NC | NC | NC | Cracks appeared | Impossible to measure | Cracks appeared |
| Heat-deterioration resistance (air) | | | | | | | | | | | |
| Change of tensile strength (%) | +3 | +3 | +6 | +5 | +4 | +5 | +3 | +5 | +8 | +3 | +8 |
| Change of elongation (%) | −15 | −13 | −25 | −12 | −16 | −5 | −1 | −20 | −35 | −8 | −37 |
| Change of hardness (JIS-A) (point) | +3 | +4 | +2 | +2 | +4 | +4 | +2 | +4 | +7 | +3 | +8 |
| Heat-deterioration resistance (aged at 150° C. for 72 hr by heating with air) | | | | | | | | | | | |
| Change of tensile strength (%) | −45 | −50 | −60 | −30 | −40 | −27 | −15 | −50 | −68 | −15 | −58 |
| Change of elongation (%) | −70 | −85 | −88 | −50 | −55 | −52 | −43 | −80 | −100 | −60 | −80 |
| Change of hardness (JIS-A) (point) | +15 | +16 | +15 | +13 | +13 | +13 | +9 | +17 | +19 | +5 | +13 |
| Low-temperature resistance (Impact brittleness test) | | | | | | | | | | | |
| $T_b$ (°C.) | −30 | −50 | −25 | −35 | −35 | −55 | −60 | −41 | −20 | −35 | −15 |
| Permanent compression set (at 120° C. for 72 hr) | | | | | | | | | | | |
| CS (%) | 19 | 40 | 33 | 28 | 31 | 27 | 22 | 22 | 21 | 38 | 22 |

Note:
*[1]Poly(vinylidene fluoride), manufactured by Penwalt Co., JSR KYNAR 731
*[2]A copolymeric resin composed of 91 mole % of vinylidene fluoride, 4 mole % of hexafluoropropylene and 5 mole % of tetrafluoroethylene.
*[3]A copolymeric elastomer composed of 80 mole % of vinylidene fluoride and 20 mole % of hexafluoropropylene.
*[4]NC means no cracking.
*[5]Hydrogenation degree: 90%
*[6]Hydrogenation degree: 95%

EXAMPLES 3-1 TO 3-5 AND COMPARATIVE EXAMPLES 3-1 TO 3-2

On each sample having the blend composition shown in the upper section of Table 3-2, compounding was effected with the respective compounding formulations shown in Table 3-1 using a Banbury mixer. The resulting compounds were subjected to press-curing under the respective conditions shown in the lower section of Table 3-1.

The resulting vulcanized rubbers were subjected to measurement of characteristics by the same test methods as in Example 1-1.

The measurement results are shown in Table 3-3.

As is obvious from Table 3-3, each of the rubber compositions of this invention can provide a vulcanized rubber composition excellent not only in gasoline resistance, gasohol resistance, sour gasoline resistance, sour gasohol resistance, permanent compression set and heat resistance but also in tensile strength, elongation and balance between gasoline resistance and low-temperature resistance.

TABLE 3-1

| Compounding formulation (parts by wt.) | a | b | c | d | e | f | g |
|---|---|---|---|---|---|---|---|
| Polymer | 100.0 | 100.0 | 100.0 | 100.0 | 100.0 | 100.0 | 100.0 |
| Zinc oxide | 4.0 | 3.0 | 5.0 | 4.0 | 2.0 | 5.0 | 3.0 |
| Trilead tetroxide | 0.3 | 0.5 | — | — | 0.3 | — | — |
| Magnesium oxide | — | — | — | — | 10.0 | — | — |
| Stearic acid | 1.0 | 1.0 | 1.0 | 1.0 | 1.0 | 1.0 | 1.0 |
| FEF carbon black*[1] | 20.0 | 20.0 | 30.0 | 20.0 | 20.0 | 60.0 | 15.0 |

TABLE 3-1-continued

| Compounding formulation (parts by wt.) | a | b | c | d | e | f | g |
|---|---|---|---|---|---|---|---|
| SRF carbon black*[2] | — | — | — | — | — | — | 15.0 |
| RS-700*[3] | 10.0 | — | — | — | — | — | 10.0 |
| TBXP*[4] | — | 20.0 | — | 10.0 | — | — | — |
| TP-95*[5] | — | — | 10.0 | — | 10.0 | 10.0 | — |
| Accelerator TT*[6] | 1.0 | 1.0 | 1.5 | 1.5 | — | 1.5 | 1.5 |
| Accelerator TET*[7] | — | — | — | 1.0 | — | — | — |
| Accelerator M*[8] | — | — | — | 0.5 | — | — | — |
| Accelerator CZ*[9] | 1.5 | 1.5 | 2.0 | — | — | 2.0 | 2.0 |
| Accelerator Nocceler 22*[10] | 0.3 | 0.3 | — | — | 0.3 | — | — |
| Talc*[11] | — | — | — | — | 2.5 | — | — |
| Sulfur | 0.4 | 0.4 | 0.5 | 0.5 | — | 0.5 | 0.7 |
| Peroxide*[12] | — | — | — | — | 7.5 | — | — |
| TC-8*[13] | — | — | 0.1 | — | — | 0.1 | — |
| Conditions for press-curing | 170° C. × 20 min | 170° C. × 20 min | 170° C. × 20 min | 170° C. × 20 min | 170° C. × 20 min | 160° C. × 20 min | 170° C. × 20 min |

Note:
*[1] Fast excluding furnace black
*[2] Semi-reinforcing furnace black
*[3] A plasticizer of poly(ether ester), manufactured by Adeka Argus Chemical Co.
*[4] Tributoxyethyl phosphate
*[5] Di(butoxyethoxyethyl) adipate
*[6] Tetramethylthiuram disulfide
*[7] Tetraethylthiuram disulfide
*[8] 2-Mercaptobenzothiazole
*[9] N-cyclohexyl-2-benzothiazolsulfenamide
*[10] 2-Mercaptoimidazoline
*[11] Triallyl isocyanurate
*[12] Perkadox 14/40 (Kayaku Noury Co., Ltd.)
*[13] 2,5-Dimethyl-2,5-di(tertiary butylperoxy)hexane

TABLE 3-2

| | Example | | | | | Comparative Example | |
|---|---|---|---|---|---|---|---|
| | 3-1 | 3-2 | 3-3 | 3-4 | 3-5 | 3-1 | 3-2 |
| Blend composition | | | | | | | |
| Vinylidene fluoride resin (I) (parts by wt.) | 30*[a] | 50*[a] | 10*[b] | 30*[a] | 30*[a] | 0 | (10*[c]) |
| Rubber (II) (parts by wt.) | 65 | 40 | 85 | 65 | 65 | 95 | 50 |
| Component (A) | | | | | | | |
| Acrylonitrile (% by wt.) | 50 | 20 | 45 | 45 | 35 | 50 | 45 |
| Component (B) | | | | | | | |
| Butadiene-1,3 (% by wt.) | 50 | 75 | 25 | 55*[d] | 65*[e] | 50 | 30 |
| Component (C) | | | | | | | |
| n-Butyl acrylate (% by wt.) | — | — | 25 | — | — | — | 25 |
| 1,1-Dihydroperfluoroethyl acrylate (% by wt.) | — | — | 5 | — | — | — | — |
| 2-Cyanoethyl acrylate (% by wt.) | — | 5 | — | — | — | — | — |
| Rubber (III) | | | | | | | |
| Hydrin rubber (parts by wt.) | 5 | 10 | — | — | 5 | — | — |
| Silicone rubber (parts by wt.) | — | — | 5 | — | — | 5 | — |
| Chlorosulfonated polyethylene | — | — | — | 5 | — | — | 40 |
| Compounding formulation (Refer to Table 3-1) | a | b | c | d | e | f | g |

Note:
*[a] Poly(vinylidene fluoride), manufactured by Penwalt Co., JSR KYNAR 731
*[b] A copolymeric resin composed of 91 mole % of vinylidene fluoride, 4 mole % of hexafluoropropylene and 5 mole % of tetrafluoroethylene.
*[c] A copolymeric elastomer composed of 80 mole % of vinylidene fluoride and 20 mole % of hexafluoropropylene.
*[d] Hydrogenation degree: 90%
*[e] Hydrogenation degree: 95%

TABLE 3-3

| | Example | | | | | Comparative Example | |
|---|---|---|---|---|---|---|---|
| Properties of crosslinked rubber | 3-1 | 3-2 | 3-3 | 3-4 | 3-5 | 3-1 | 3-2 |
| Tensile strength (kg/cm$^2$) | 193 | 250 | 146 | 314 | 290 | 240 | 210 |
| Elongation (%) | 310 | 240 | 225 | 540 | 510 | 400 | 265 |
| Hardness (JIS-A) | 73 | 75 | 65 | 80 | 77 | 76 | 72 |
| Gasoline resistance (after immersion at 40° C. for 48 hr in Fuel C) | | | | | | | |
| ΔV (%) | +21 | +31 | +28 | +26 | +31 | +34 | +52 |
| Gasohol resistance (after immersion at 40° C. for 48 hr in a solution consisting of | | | | | | | |

TABLE 3-3-continued

| Properties of crosslinked rubber | Example | | | | | Comparative Example | |
|---|---|---|---|---|---|---|---|
| | 3-1 | 3-2 | 3-3 | 3-4 | 3-5 | 3-1 | 3-2 |
| 80 vol. % of Fuel C and 20 vol. % of ethanol) | | | | | | | |
| ΔV (%) | +40 | +49 | +47 | +40 | +50 | +58 | +85 |
| Sour gasoline resistance (after immersion at 40° C. for 72 hr by n cycles in Fuel C containing 2.5 wt. % of lauroyl peroxide) | | | | | | | |
| n = 3 (3 cycles) | NC* | NC | NC | NC | NC | Cracks appeared | NC |
| n = 10 (10 cycles) | NC | NC | NC | NC | NC | Cracks appeared | Cracks appeared |
| Sour gasohol resistance (after immersion at 40° C. for 72 hr by n cycles in a solultion consisting of 80 vol. % of Fuel C containing 2.5 wt. % of lauroyl peroxide and 20 vol. % of ethanol) | | | | | | | |
| n = 3 (3 cycles) | NC | NC | NC | NC | NC | Cracks appeared | Cracks appeared |
| n = 6 (6 cycles) | NC | NC | NC | NC | NC | Cracks appeared | Cracks appeared |
| n = 10 (10 cycles) | NC | Cracks appeared | NC | NC | NC | Cracks appeared | Cracks appeared |
| Heat-deterioration resistance (aged at 120° C. for 72 hr by heating with air) | | | | | | | |
| Change of tensile strength (%) | +4 | +4 | +7 | +5 | +7 | +8 | +5 |
| Change of elongation (%) | −15 | −14 | −22 | −17 | −22 | −36 | −25 |
| Change of hardness (JIS-A) (point) | +3 | +5 | +3 | +5 | +4 | +8 | +7 |
| Low-temperature resistance (Impact brittleness test) | | | | | | | |
| $T_6$ (°C.) | −30 | −47 | −28 | −55 | −59 | −21 | −2 |
| Permanent compression set (at 120° C. for 70 hr) | | | | | | | |
| CS (%) | 20 | 42 | 35 | 38 | 24 | 21 | 50 |

Note: *NC means no cracking.

EXAMPLES 4-1 to 4-5 and Comparative Examples 4-1 to 4-3

On each sample having the blend composition shown in the upper section of Table 4-2, compounding was effected with the respective compounding formulations shown in Table 4-1 using a Banbury mixer. The resulting compounds were subjected to press-curing under the respective conditions shown in the lower section of Table 4-1.

The resulting crosslinked rubbers were subjected to measurement of characteristics by the same test methods as in Example 1-1.

The measurement results are shown in the lower section of Table 4-2.

As is obvious from Table 4-2, each of the rubber compositions of this invention can provide a vulcanized rubber composition excellent not only in gasoline resistance, gasohol resistance, sour gasoline resistance, sour gasohol resistance and heat resistance but also in tensile strength, elongation and balance between gasoline resistance and low-temperature resistance.

TABLE 4-1

| Compounding formulation (parts by wt.) | a | b | c |
|---|---|---|---|
| Polymer | 100.0 | 100.0 | 100.0 |
| Zinc oxide | — | 5.0 | 5.0 |
| Stearic acid | 1.0 | 1.0 | 1.0 |
| HAF carbon black*[1] | 20.0 | — | — |
| FEF carbon black*[2] | — | 20.0 | 60.0 |
| Processing adjuvant TE-80*[3] | 1.0 | 1.0 | 1.0 |
| RS-7*[4] | 10.0 | — | — |
| TBXP*[5] | 10.0 | — | — |
| TP-95*[6] | — | 20.0 | 10.0 |
| Accelerator TT*[7] | — | 1.5 | 1.5 |
| Accelerator CZ*[8] | — | 2.0 | 2.0 |
| Sulfur | — | 0.5 | 0.5 |
| Ammonium benzoate | 2.0 | — | — |

TABLE 4-1-continued

| Compounding formulation (parts by wt.) | a | b | c |
|---|---|---|---|
| Conditions for press-curing | 165° C. × 30 min | 170° C. × 20 min | 160° C. × 20 min |

Note:
*[1] High abrasion furnace black
*[2] Fast excluding furnace black
*[3] A metal salt of a fatty acid, manufactured by Technical Processing Co.
*[4] A plasticizer of poly(ether ester) type, manufactured by Adeka Argus Chemical Co.
*[5] Tributoxyethyl phosphate
*[6] Di(butoxyethoxyethyl) adipate
*[7] Tetrathiuram disulfide
*[8] N-cyclohexyl-2-benzothiazolsulfenamide

TABLE 4-2

| | Example | | | | | Comparative Example | | |
|---|---|---|---|---|---|---|---|---|
| | 4-1 | 4-2 | 4-3 | 4-4 | 4-5 | 4-1 | 4-2 | 4-3 |
| Blend Composition | | | | | | | | |
| Vinylidene fluoride resin (I) (parts by wt.) | 40*[2] | 20*[1] | 20*[1] | 20*[1] | 20*[1] | 0 | 65*[1] | 0 |
| Acrylic rubber (II) (parts by wt.) | 55 | — | 20 | — | — | — | 30 | — |
| Component (A) | | | | | | | | |
| Methyl acrylate (% by wt.) | 7 | — | — | — | — | — | — | — |
| Ethyl acrylate (% by wt.) | 10 | — | 27 | — | — | — | — | — |
| n-Butyl acrylate (% by wt.) | — | — | 60 | — | — | — | — | — |
| Methoxyethyl acrylate (% by wt.) | 70 | — | — | — | — | — | — | — |
| Component (B) | | | | | | | | |
| Ethylidenenorbornene (% by wt.) | — | — | 3 | — | — | — | — | — |
| Allyl glycidyl ether (% by wt.) | 3 | — | — | — | — | — | 3 | — |
| Component (C) | | | | | | | | |
| Acrylonitrile (% by wt.) | 10 | — | 10 | — | — | — | — | — |
| Nitrile rubber (II) (parts by wt.) | 0 | 60 | 40 | 60 | 60 | 100 | 0 | 50 |
| Component (D) | | | | | | | | |
| Acrylonitrile (% by wt.) | — | 50 | 20 | 45 | 45 | 50 | — | 45 |
| Component (E) | — | 50 | 80 | 20 | 55*[3] | 50 | — | 55 |
| Butadiene-1,3 (% by wt.) | | | | | | | | |
| Component (F) | | | | | | | | |
| n-Butyl acrylate (% by wt.) | — | — | — | 30 | — | — | — | — |
| Acrylic acid (% by wt.) | — | — | — | 5 | — | — | — | — |
| Other resin components (III) (parts by wt.) | | | | | | | | |
| Vinyl chloride resin | — | 20 | 15 | 20 | 20 | — | — | 50 |
| Phenolic resin | 5 | — | 5 | — | — | — | 5 | — |
| Compounding formulation (Refer to TABLE 4-1) | a | b | b | b | b | c | a | b |
| Properties of crosslinked rubber | | | | | | | | |
| Tensile strength (kg/cm²) | 185 | 240 | 220 | 210 | 230 | 220 | 260 | 240 |
| Elongation (%) | 420 | 410 | 400 | 390 | 450 | 330 | 25 | 320 |
| Hardness (JIS-A) | 78 | 72 | 70 | 73 | 77 | 73 | 85 | 75 |
| Gasoline resistance (after immersion at 40° C. for 48 hr in Fuel C) ΔV (%) | +7 | +12 | +10 | +15 | +14 | +30 | +10 | +12 |
| Gasohol resistance (after immersion at 40° C. for 48 hr in a solution consisting of 80 vol. % of Fuel C and 20 vol. % ethanol) ΔV (%) | +21 | +25 | +26 | +23 | +28 | +55 | +35 | +33 |
| Sour gasoline resistance (after immersion at 40° C. for 72 hr by n cycles in Fuel C containing 2.5 wt. % of lauroyl peroxide) | | | | | | | | |
| n = 3 (3 cycles) | NC*[4] | NC | NC | NC | NC | Cracks appeared | Impossible to measure | Cracks appeared |
| n = 10 (10 cycles) | NC | NC | NC | NC | NC | Cracks appeared | Impossible to measure | Cracks appeared |
| Sour gasohol resistance (after immersion at 40° C. for 72 hr by n cycles in a solution consisting of 80 vol. % of Fuel C containing 2.5 wt. % of lauroyl peroxide and 20 vol. % of ethanol) | | | | | | | | |
| n = 3 (3 cycles) | NC | NC | NC | NC | NC | Cracks appeared | Impossible to measure | Cracks appeared |
| n = 6 (6 cycles) | NC | NC | NC | NC | NC | Cracks appeared | Impossible to measure | Cracks appeared |
| n = 10 (10 cycles) | NC | NC | NC | NC | NC | Crack appeared | Impossible to measure | Cracks appeared |
| Heat-deterioration resistance (aged at 120° C. for 72 hr by heating with air) | | | | | | | | |
| Change of tensile strength (%) | +3 | +4 | +2 | +3 | +4 | +8 | +3 | +9 |
| Change of elongation (%) | −25 | −32 | −31 | −35 | −28 | −35 | −7 | −41 |
| Change of hardness (JIS-A) (point) | +3 | +2 | +3 | +2 | +3 | +7 | +2 | +8 |
| Low-temperature resistance: Impact | | | | | | | | |

TABLE 4-2-continued

|  | Example | | | | | Comparative Example | | |
|---|---|---|---|---|---|---|---|---|
|  | 4-1 | 4-2 | 4-3 | 4-4 | 4-5 | 4-1 | 4-2 | 4-3 |
| brittleness test | | | | | | | | |
| $T_b$ (°C.) | −32 | −31 | −32 | −29 | −35 | −20 | −34 | −25 |
| Roll processability*5 | ○ | ◎ | ◎ | ◎ | ◎ | ○ | ○ | ○ |

Note:
*1Poly(vinylidene fluoride), manufactured by Penwalt Co., JSR KYNAR 731
*2A copolymeric resin composed of 91 mole % of vinylidene fluoride, 4 mole % of hexafluoropropylene and 5 mole % of tetrafluoroethylene
*3Hydrogenation degree: 90%
*4NC means no cracking.
*5Windability when wound round a 10-inch roll having a surface temperature of 60° C. for 10 minutes was evaluated visually.
◉ Very good, ○Good, X Bad

EXAMPLES 5-1 TO 5-4 AND COMPARATIVE EXAMPLES 5-1 TO 5-2

On each sample having the blend composition shown in Table 5-2, compounding was effected with the respective compounding formulations shown in Table 5-1 using a Banbury mixer. The resulting compounds were subjected to presscuring under the respective conditions shown in the lower section of Table 5-1.

The resulting vulcanized rubbers were subjected to measurement of characteristics by the same test methods as in Example 1-1.

The measurement results are shown in Table 5-3.

As is obvious from Table 5-3, each of the rubber compositions of this invention can provide a vulcanized rubber composition excellent not only in gasoline resistance, gasohol resistance, sour gasoline resistance, sour gasohol resistance, ozone resistance and heat resistance but also in tensile strength, elongation and balance between gasoline resistance and low-temperature resistance.

TABLE 5-1

| Compounding formulation (parts by wt.) | a | b | c | d | e | f | g |
|---|---|---|---|---|---|---|---|
| Polymer | 100.0 | 100.0 | 100.0 | 100.0 | 100.0 | 100.0 | 100.0 |
| Zinc oxide | 5.0 | — | — | — | — | — | — |
| Lead monoxide | — | — | 2.0 | — | — | 2.0 | 11.0 |
| Trilead tetroxide | — | 0.5 | — | — | 0.5 | — | — |
| Stearic acid | 1.0 | 1.0 | 1.0 | 1.0 | 1.0 | 1.0 | 1.0 |
| HAF carbon black*1 | 20.0 | 20.0 | 18.0 | 20.0 | 18.0 | 50.0 | 12.0 |
| FEF carbon black*2 | — | 4.0 | — | — | 2.0 | — | — |
| SRF carbon black*3 | — | — | 2.0 | — | — | 10.0 | 8.0 |
| Processing adjuvant TE-80*4 | 1.0 | 1.0 | 1.0 | 1.0 | 1.0 | 1.0 | 1.0 |
| RS-700*5 | 10.0 | 20.0 | 10.0 | — | 10.0 | 10.0 | 10.0 |
| TBXP*6 | — | — | — | 15.0 | — | — | — |
| DOP*7 | — | — | — | 1.0 | — | — | — |
| TAIC*8 | — | — | — | 0.2 | — | — | — |
| Accelerator TT*9 | — | — | — | — | — | 1.0 | 1.0 |
| Accelerator TRA*10 | — | 0.4 | — | — | — | — | — |
| Accelerator EUR*11 | — | 0.8 | — | — | — | — | — |
| Accelerator Nocceler 22*12 | — | 0.3 | — | — | 0.3 | — | — |
| Sulfur | — | — | — | — | — | 0.5 | — |
| Ammonium benzoate | 2.0 | — | 2.0 | 2.0 | 2.0 | — | 2.0 |
| Potassium stearate | — | 2.4 | — | — | — | — | — |
| Peroxide | — | — | — | 0.2 | — | — | — |
| Conditions for press-curing | 170° C. × 30 min | 170° C. × 20 min | 170° C. × 30 min | 170° C. × 30 min | 170° C. × 30 min | 165° C. × 30 min | 170° C. × 30 min |

Note:
*1High abrasion furnace black
*2Fast excluding furnace black
*3Semi-reinforcing furnace black
*4A metal salt of a fatty acid, manufactured by Technical Processing Co.
*5A plasticizer of poly(ether ester) type, manufactured by Adeka Argus Chemical Co.
*6Tributoxyethyl phosphate
*7Dioctyl phthalate
*8Triallyl isocyanurate
*9Tetramethylthiuram disulfide
*10Dipentamethylenethiuram hexasulfide
*111,3-Diethylthiourea
*122-Mercaptoimidazoline

TABLE 5-2

| Blend composition | Example | | | | Comparative Example | |
|---|---|---|---|---|---|---|
|  | 5-1 | 5-2 | 5-3 | 5-4 | 5-1 | 5-2 |
| Vinylidene fluoride resin (I) (parts by wt.) | 30*a | 50*b | 10*a | 30*a | 0 | (10*c) |
| Acrylic rubber (II) (parts by wt.) | 65 | 40 | 85 | 65 | 95 | 50 |
| Component (A) | | | | | | |
| Methyl acrylate (% by wt.) | 30 | 37 | — | 57 | 57 | — |

TABLE 5-2-continued

| Blend composition | Example 5-1 | Example 5-2 | Example 5-3 | Example 5-4 | Comparative Example 5-1 | Comparative Example 5-2 |
|---|---|---|---|---|---|---|
| Ethyl acrylate (% by wt.) | 7 | 17 | 45 | — | — | 47 |
| n-Butyl acrylate (% by wt.) | — | — | — | — | — | 40 |
| Methoxyethyl acrylate (% by wt.) | 60 | 43 | 40 | 40 | 40 | — |
| Component (B) | | | | | | |
| Ethylidenenorbornene (% by wt.) | — | — | — | — | 3 | — |
| Allyl glycidyl ether (% by wt.) | 3 | — | 5 | 3 | — | 3 |
| Vinyl chloroacetate (% by wt.) | — | 3 | — | — | — | — |
| Component (C) | | | | | | |
| Acrylonitrile (% by wt.) | — | — | 10 | — | — | 10 |
| Rubber (III) | | | | | | |
| Hydrin rubber (parts by wt.) | 5 | 10 | 0 | 0 | 0 | 0 |
| Chlorosulfonated polyethylene (parts by wt.) | 0 | 0 | 5 | 0 | 5 | 40 |
| Chlorinated polyethylene (parts by wt.) | 0 | 0 | 0 | 5 | 0 | 0 |
| Compounding formulation (Refer to Table 5-1) | a | b | c | d | f | g |

Note:
*$^a$Poly(vinylidene fluoride), manufactured by Penwalt Co., JSR KYNAR 731
*$^b$A copolymeric resin composed of 91 mole % of vinylidene fluoride, 4 mole % of hexafluoropropylene and 5 mole % of tetrafluoroethylene.
*$^c$A copolymeric rubber composed of 80 mole % of vinylidene fluoride and 20 mole % of hexafluoropropylene.

TABLE 5-3

| Properties of crosslinked rubber | Example 5-1 | Example 5-2 | Example 5-3 | Example 5-4 | Comparative Example 5-1 | Comparative Example 5-2 |
|---|---|---|---|---|---|---|
| Tensile strength (kg/cm$^2$) | 172 | 195 | 154 | 163 | 152 | 100 |
| Elongation (%) | 410 | 440 | 395 | 380 | 395 | 395 |
| Hardness (JIS-A) | 72 | 77 | 68 | 69 | 70 | 64 |
| Gasoline resistance (after immersion at 40° C. for 48 hr in Fuel C) | | | | | | |
| ΔV (%) | +20 | +15 | +23 | +20 | +49 | +93 |
| Gasohol resistance (after immersion at 40° C. for 48 hr in a solution consisting of 80 vol. % of Fuel C and 20 vol. % of ethanol) | | | | | | |
| ΔV (%) | +50 | +32 | +57 | +44 | +105 | +73 |
| Sour gasoline resistance (after immersion at 40° C. for 72 hr by n cycles in Fuel C containing 2.5 wt. % of lauroyl peroxide) | | | | | | |
| n = 3 (3 cycles) | NC* | NC | NC | NC | Softened | NC |
| n = 10 (10 cycles) | NC | NC | NC | NC | Softened | NC |
| Sour gasohol resistance (after immersion at 40° C. for 72 hr by n cycles in a solutlion consisting of 80 vol. % of Fuel C containing 2.5 wt. % of lauroyl peroxide and 20 vol. % of ethanol) | | | | | | |
| n = 3 (3 cycles) | NC | NC | NC | NC | Softened | NC |
| n = 6 (6 cycles) | NC | NC | NC | NC | Softened | NC |
| n = 10 (10 cycles) | NC | NC | NC | NC | Softened | NC |
| Heat-deterioration resistance (aged at 150° C. for 72 hr by heating with air) | | | | | | |
| Change of tensile strength (%) | +2 | +7 | +10 | +3 | +7 | −8 |
| Change of elongation (%) | −18 | −30 | −27 | −51 | −55 | −58 |
| Change of hardness (JIS-A) (point) | +3 | +4 | +2 | +5 | +6 | +4 |
| Ozone resistance (static) (80 pphm, 40° C., 0 to 100% elongation) | | | | | | |
| 24 hr | NC | NC | NC | NC | NC | NC |
| Ozone resistance (dynamic) (80 pphm, 40° C., 0 to 20% elongation) | | | | | | |
| 24 hr | NC | NC | NC | NC | NC | NC |
| 288 hr | NC | NC | NC | NC | NC | NC |
| Low-temperature resistance (Gheman torsion test) | | | | | | |
| T100 (°C.) | −35 | −38 | −27 | −32 | −12 | −27 |

Note: *NC means no cracking.

EXAMPLES 6-1 TO 6-5 AND COMPARATIVE EXAMPLES 6-1 TO 6-2

On each sample having the blend composition shown in Table 6-2, compounding was effected with the respective compounding formulations shown in Table 6-1 using a Banbury mixer. The resulting compounds were subjected to press-curing under the respective conditions shown in the lower section of Table 6-1.

The resulting vulcanized rubbers were subjected to measurement of characteristics by the same test methods as in Example 1-1.

The measurement results are shown in Table 6-3.

As is obvious from Table 6-3, each of the rubber compositions of this invention can provide a vulcanized rubber composition excellent not only in gasoline resistance, gasohol resistance, sour gasoline resistance, sour gasohol resistance and heat resistance but also in tensile strength, elongation and balance between gasoline resistance and low-temperature resistance.

TABLE 6-1

| Compounding formulation (parts by wt.) | a | b | c | d | e | f |
|---|---|---|---|---|---|---|
| Polymer | 100.0 | 100.0 | 100.0 | 100.0 | 100.0 | 100.0 |
| Zinc oxide | 5.0 | 2.0 | — | — | — | 2.0 |
| Magnesium oxide | — | 5.0 | 5.0 | 5.0 | 5.0 | — |
| Stearic acid | 1.0 | 1.0 | 1.0 | 1.0 | 1.0 | 1.0 |
| HAF carbon black[*1] | — | — | — | — | 50.0 | — |
| SRF carbon black[*2] | 30.0 | 20.0 | 10.0 | 20.0 | — | 20.0 |
| MT carbon black[*3] | — | — | 10.0 | 10.0 | — | — |
| TBXP[*4] | — | 15.0 | — | — | — | 15.0 |
| TP-95[*5] | 10.0 | — | — | — | — | — |
| RS-700[*6] | — | — | 10.0 | 10.0 | 10.0 | — |
| TAIC[*7] | — | 2.5 | — | 2.5 | — | — |
| Accelerator TT[*8] | 1.5 | — | — | — | — | 0.8 |
| Accelerator TET[*9] | 1.0 | — | — | — | — | — |
| Accelerator M[*10] | 0.5 | — | — | — | — | — |
| Accelerator CZ[*11] | — | — | — | — | — | 1.0 |
| Sulfur | 0.5 | — | — | — | — | 0.5 |
| Hexamethylenediamine carbamate | 1.0 | — | 2.0 | — | 2.0 | 1.0 |
| Peroxide[*12] | — | 7.5 | — | 7.5 | — | — |
| Conditions for press-curing | 170° C. × 20 min | 170° C. × 20 min | 170° C. × 30 min | 170° C. × 20 min | 170° C. × 30 min | 170° C. × 20 min |

Note:
[*1]High abrasion furnace black
[*2]Semi-reinforcing furnace black
[*3]Medium thermal furnace black
[*4]Tributoxyethyl phosphate
[*5]Di(butoxyethoxyethyl) adipate
[*6]A plasticizer of poly(ether ester) type, manufactured by Adeka Argus Chemical Co.
[*7]Triallyl isocyanurate
[*8]Tetramethylthiuram disulfide
[*9]Tetraethylthiuram disulfide
[*10]Mercaptobenzothiazole
[*11]N-cyclohexyl-2-benzothiazolsulfenamide
[*12]Perkadox 14/40 (Kayaku Noury Co., Ltd.)

TABLE 6-2

| | Example | | | | | Comparative Example | |
|---|---|---|---|---|---|---|---|
| Blend composition | 6-1 | 6-2 | 6-3 | 6-4 | 6-5 | 6-1 | 6-2 |
| Vinylidene fluoride resin (I) (parts by wt.) | 30[*a] | 50[*b] | 10[*a] | 30[*a] | 30[*a] | 70[*a] | 0 |
| Acrylic rubber (II) (parts by wt.) | 20 | 30 | 40 | 0 | 40 | 0 | 90 |
| Component (A) | | | | | | | |
| Methyl acrylate (% by wt.) | 40 | 37 | | | | | 27 |
| Ethyl acrylate (% by wt.) | | | 47 | | 47 | | |
| Methoxyethyl acrylate (% by wt.) | 57 | 40 | 40 | | 40 | | 60 |
| Component (B) | | | | | | | |
| Ethylidenenorbornene (% by wt.) | | | | | 3 | | |
| Allylglycidyl ether (% by wt.) | 3 | 3 | 3 | | | | 3 |
| Component (C) | | | | | | | |
| Acrylonitrile (% by wt.) | | 20 | 10 | | 10 | | 10 |
| Nitrile rubber (II) (parts by wt.) | 50 | 20 | 0 | 50 | 20 | 10 | 0 |
| Component (D) | | | | | | | |
| Acrylonitrile (% by wt.) | 40 | 45 | | 50 | 35 | 5 | |
| Component (E) | | | | | | | |
| Butadiene-1,3 (% by wt.) | 60 | 55 | | 50 | 65 | 95 | |
| Hydrogenation degree (%) | 90 | 0 | | 0 | 90 | 0 | |
| Fluororubber (III) | | | | | | | |
| Viton GF[*c] (parts by wt.) | 0 | 0 | 50 | 20 | 10 | 20 | 10 |
| Compounding formulation | a | f | c | d | b | d | e |

TABLE 6-2-continued

| | Example | | | | | Comparative Example | |
|---|---|---|---|---|---|---|---|
| Blend composition | 6-1 | 6-2 | 6-3 | 6-4 | 6-5 | 6-1 | 6-2 |

(Refer to Table 6-1)

Note:
*<sup>a</sup>Poly(vinylidene fluoride), manufactured by Penwalt Co., JSR KYNAR 731
*<sup>b</sup>A copolymeric resin composed of 91 mole % of vinylidene fluoride, 4 mole % of hexafluoropropylene and 5 mole % of tetrafluoroethylene.
*<sup>c</sup>A fluororubber of vinylidene fluoride-hexafluoropropylene-tetrafluoroethylene type, manufactured by Du Pont.

TABLE 6-3

| Properties of crosslinked rubber | Example | | | | | Comparative Example | |
|---|---|---|---|---|---|---|---|
| | 6-1 | 6-2 | 6-3 | 6-4 | 6-5 | 6-1 | 6-2 |
| Tensile strength (kg/cm$^2$) | 195 | 190 | 172 | 180 | 195 | 240 | 180 |
| Elongation (%) | 510 | 430 | 360 | 360 | 520 | 75 | 310 |
| Hardness (JIS-A) | 80 | 77 | 81 | 74 | 79 | 94 | 75 |
| Gasoline resistance (after immersion at 40° C. for 48 hr in Fuel C) ΔV (%) | +19 | +28 | +8 | +28 | +21 | +8 | +35 |
| Gasohol resistance (after immersion at 40° C. for 48 hr in a solution consisting of 80 vol. % of Fuel C and 20 vol. % of ethanol) ΔV (%) | +46 | +49 | +18 | +48 | +45 | +12 | +62 |
| Sour gasoline resistance (after immersion at 40° C. for 72 hr by n cycles in Fuel C containing 2.5 wt. % of lauroyl peroxide) | | | | | | | |
| n = 3 (3 cycles) | NC* | NC | NC | NC | NC | NC | Softened |
| n = 10 (10 cycles) | NC | NC | NC | NC | NC | NC | Softened |
| Sour gasohol resistance (after immersion at 40° C. for 72 hr by n cycles in a solution consisting of 80 vol. % of Fuel C containing 2.5 wt. % of lauroyl peroxide and 20 vol. % of ethanol) | | | | | | | |
| n = 3 (3 cycles) | NC | NC | NC | NC | NC | NC | Softened |
| n = 6 (6 cycles) | NC | NC | NC | NC | NC | NC | Softened |
| n = 10 (10 cycles) | NC | NC | NC | NC | NC | NC | Softened |
| Heat-deterioration resistance (aged at 120° C. for 72 hr by heating with air) | | | | | | | |
| Change of tensile strength (%) | −4 | +7 | +3 | −7 | +9 | +2 | −28 |
| Change of elongation (%) | −20 | −25 | −10 | −24 | −25 | −4 | −55 |
| Change of hardness (JIS-A) (point) | +2 | +5 | +3 | +4 | +7 | +2 | +4 |
| Low-temperature resistance (Gheman torsion test) | | | | | | | |
| T100 (°C.) | −37 | −32 | −25 | −27 | −34 | Impossible to measure | −25 |

Note: *NC means no cracking.

EXAMPLES 7-1 TO 7-9 AND COMPARATIVE EXAMPLES 7-1 TO 7-4

Preparation of Mixed Compound

The components of an unvulcanized rubber compound shown in Table 7-1 were subjected to kneading on rubber test-kneading rolls (6-inch and 14-inch rolls) to obtain mixed compound sheets having a smooth surface of 8 mm in thickness, 50 mm in width and 80 mm in length.

Adhesion by Vulcanization

A rubber layer (A) comprising the rubber composition of this invention and another rubber layer (B) comprising a chlorohydrin rubber (CHC) were superimposed in the above-mentioned mixed compound sheet; and the resulting assembly was inserted into a compression type mold and then subjected to vulcanization under a surface pressure of 2 kg/cm$^2$ at 170° C. for 15 minutes, using an electrically heated press to obtain a sheet of laminate.

Measurement of Adhesion

The above laminate sheet was cut into a rectangular piece having a width of 2.5 mm. The rectangular piece was subjected to 90°-peeling in accordance with the peeling test method specified in item 7 of JIS K 6801 to determine the adhesion among the layers.

Other tests were conducted using the above-mentioned mixed compound sheets in accordance with the same test methods as in Example 1-1.

The test results are shown in Table 7-2.

As is obvious from Table 7-2, the rubber layer (A) comprising the rubber composition of this invention and forming the inner tube layer of a rubber hose is excellent not only in gasoline resistance, sour gasoline resistance, gashol resistance, sour gasohol resistance and heat resistance but also in tensile strength, elongation and balance between gasoline resistance and low-temperature resistance.

Further, as is obvious from Table 7-3 (Examples 7-5 to 7-9), the rubber layer (A) and the rubber layer (B) are strongly bonded by vulcanization to each other. Therefore, it can be seen that the laminate of this invention and the hose consisting of the laminate are both suitable for a rubber hose for fuels having an oil-resistant inner tube layer excellent in gasoline resistance, gasohol resistance, sour gasoline resistance and sour gasohol resistance. The laminate and the hose of this invention are also applicable to a control circuit for carburetor utilizing a suction pressure generated in the intake manifold of engine, to a hose in which vapor of gasoline flows, and to a power transmission circuit system hose in which mineral oil flows such as a hose for piping a power steering-oil-torque converter-air brake.

TABLE 7-1

| Compounding formulation (parts by wt.) | a | b | c | d | e | f | g | h | i |
|---|---|---|---|---|---|---|---|---|---|
| Polymer | 100 | 100 | 100 | 100 | 100*15 | 100 | 100*16 | 100 | 100 |
| Zinc oxide | — | — | 5 | 5 | — | 5 | — | — | 5 |
| Stearic acid | 1 | 1 | — | 1 | — | 1 | 2 | 1 | 1 |
| HAF carbon black*1 | 20 | — | — | — | — | — | — | — | — |
| FEF carbon black*2 | — | 20 | 20 | 20 | — | — | 40 | 60 | 60 |
| SRF carbon black*3 | — | — | — | — | — | 50 | — | — | — |
| RS 700*4 | 10 | — | — | 10 | — | — | — | 10 | — |
| TBXP*5 | — | 10 | — | — | — | — | — | — | — |
| TP-95*6 | — | — | 10 | 10 | — | — | — | — | 10 |
| Epoxy resin*7 | — | — | — | — | — | 5 | — | — | — |
| Maleic anhydride | — | — | — | — | — | 0.3 | — | — | — |
| 2-Methylimidazole | — | — | — | — | — | 1.0 | — | — | — |
| Magnesium oxide | — | — | — | — | 3 | — | 5 | — | — |
| Calcium hydroxide | — | — | — | — | 6 | 10 | — | — | — |
| MT carbon black*14 | — | — | — | — | 20 | — | — | — | — |
| Sulfur | — | — | 0.5 | 0.5 | — | 0.3 | — | — | 0.5 |
| Accelerator TT*8 | — | — | 1.5 | 1.5 | — | — | — | — | 1.5 |
| Accelerator CZ*9 | — | — | 2.0 | 2.0 | — | 2.0 | — | — | 2.0 |
| Accelerator TET*10 | — | — | — | — | — | 1.5 | — | — | — |
| Accelerator TS*11 | — | — | — | — | — | 1.0 | — | — | — |
| Ammonium benzoate | 2 | 2 | — | — | — | — | — | 2 | — |
| CMP #20*12 | — | — | — | — | 1.35 | — | — | — | — |
| CMB #30*13 | — | — | — | — | 2.60 | — | — | — | — |
| Na-22 | — | — | — | — | — | — | 1.2 | — | — |
| Vulcanization conditions | 170° C. × 30 min | 170° C. × 30 min | 170° C. × 30 min | 170° C. × 30 min | 170° C. × 30 min | 170° C. × 30 min | 170° C. × 30 min | 170° C. × 30 min | 170° C. × 30 min |

Note:
*1 High abrasion furnace black
*2 Fast excluding furnace black
*3 Semi-reinforcing furnace black
*4 A plasticizer of poly(ether ester) type, manufactured by Adeka Argus Chemical Co.
*5 Tributoxyethyl phosphate
*6 Di(butoxyethoxyethyl) adipate
*7 Epikoat #828 of Shell Chemical Co.
*8 Tetramethylthiuram disulfide
*9 N-cyclohexylbenzothiazosulfenamide
*10 Tetraethylthiuram disulfide
*11 Tetramethylthiuram 25
*12 Vulcanization accelerator of polycyclic quaternary phosphate type, manufactured by Du Pont.
*13 Vulcanization accelerator of aromatic salt type, manufactured by Du Pont
*14 Medium thermal furnace black
*15 Fluororubber E 45 manufactured by Du Pont
*16 Epichlomer H manufactured by Osaka Soda

TABLE 7-2

| Blend composition | Example | | | | Comparative Example | | | |
|---|---|---|---|---|---|---|---|---|
| | 7-1 | 7-2 | 7-3 | 7-4 | 7-1 | 7-2 | 7-3 | 7-4 |
| Vinylidene fluoride resin (I)*a (parts by wt.) | 30 | 40 | 20 | 25 | | | 3 | 70 |
| Rubber (II) (parts by wt.) | 70 | 60 | 80 | 75 | 100 | 100 | 97 | 30 |
| Methyl acrylate (% by wt.) | 10 | 14 | | | 10 | | | 24 |
| Ethyl acrylate (% by wt.) | 32 | 30 | | | 32 | | | 10 |
| Butyl acrylate (% by wt.) | | 5 | | | | | | |
| Methoxyethyl acrylate (% by wt.) | 50 | 45 | | | 50 | | | 60 |
| Butadiene-1,3 (% by wt.) | | | 55 | 65* | | 55 | 65* | |
| Acrylonitrile (% by wt.) | 5 | | 45 | 35 | 5 | 45 | 35 | |
| Allyl glycidyl ether (% by wt.) | 3 | 3 | | | 3 | | | 3 |
| Diethylaminoethyl methacrylate (% by wt.) | | 3 | 3 | | | | | 3 |
| Compounding formulation (Refer to Table 7-1) | a | b | c | d | h | i | i | b |
| Properties of crosslinked rubber | | | | | | | | |
| Tensile strength (kg/cm²) | 170 | 190 | 180 | 220 | 130 | 210 | 190 | 197 |
| Elongation (%) | 500 | 450 | 420 | 530 | 350 | 360 | 400 | 70 |
| Hardness (JIS-A) | 79 | 84 | 70 | 77 | 55 | 73 | 70 | 93 |
| Gasoline resistance (after immersion at 40° C. for 48 hr in Fuel C) | | | | | | | | |

TABLE 7-2-continued

| | | | | | | | | |
|---|---|---|---|---|---|---|---|---|
| ΔV (%) Gasohol resistance (after immersion at 40° C. for 48 hr in a solution containing 80 vol. % of Fuel C and 20 Vol. % of ethanol) | +25 | +12 | +22 | +24 | +80 | +35 | +40 | +9 |
| ΔV (%) Sour gasoline resistance (after immersion at 40° C. for 72 hr by n cycles in Fuel C containing 2.5 wt. % of lauroyl peroxide) | +51 | +34 | +40 | +48 | +240 | +59 | +68 | +15 |
| n = 3 (3 cycles) | NC | NC | NC | NC | Softened | Cracks appeared | NC | NC |
| n = 10 (10 cycles) | NC | NC | NC | NC | Softened | Cracks appeared | Cracks appeared | NC |
| Sour gasohol resistance (after immersion at 40° C. for 72 hr by n cycles in a solution consisting of 80 vol. % of Fuel C containing 2.5 wt. % of lauroyl peroxide and 20 vol. % of ethanol) | | | | | | | | |
| n = 3 (3 cycles) | NC | NC | NC | NC | Softened | Cracks appeared | NC | NC |
| n = 10 (10 cycles) | NC | NC | NC | NC | Softened | Cracks appeared | Cracks appeared | NC |
| Heat-deterioration resistance (aged at 120° C. for 72 hr by heating with air) | | | | | | | | |
| Change of tensile strength (%) | +4 | +5 | +3 | +3 | +20 | +10 | +5 | +2 |
| Change of elongation (%) | −12 | −9 | −18 | −11 | −35 | −36 | −20 | −3 |
| Change of hardness (JIS-A) (point) | +3 | +1 | +5 | +3 | +12 | +7 | +4 | +2 |
| Low-temperature resistance (Impact brittleness test) | | | | | | | | |
| $T_b$ (°C.) | −35 | −33 | −33 | −58 | −22 | −24 | −41 | |

Note:
*<sup>a</sup>Poly(vinylidene fluoride) manufactured by Penwalt Co., JSR KYNAR 740
NC means no cracking.

TABLE 7-3

| | Example | | | | |
|---|---|---|---|---|---|
| | 7-5 | 7-6 | 7-7 | 7-8 | 7-9 |
| Rubber layer (A) | Compound of Example 7-1 | Compound of Example 7-2 | Compound of Example 7-3 | Compound of Example 7-4 | Compound of Example 7-1 |
| Rubber layer (B) | CHC compound (g of Table 7-1) | FKM compound (e of Table 7-1) | CHC compound (g of Table 7-1) | CHC compound (g of Table 7-1) | NBR compound (f of Table 7-1) |
| Adhesion of laminate (kg/cm²) | 2.5 | 2.0 | 2.8 | 2.4 | 2.2 |

EXAMPLES 8-1 TO 8-5 AND COMPARATIVE EXAMPLES 8-1 TO 8-2

Figure 1:
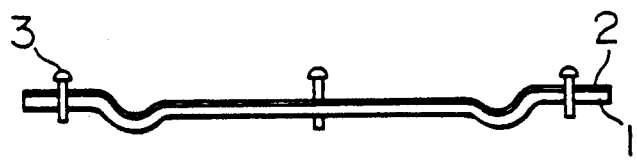
FIG. 1 is a sectional view of a diaphragm of this invention.
Figure 2:
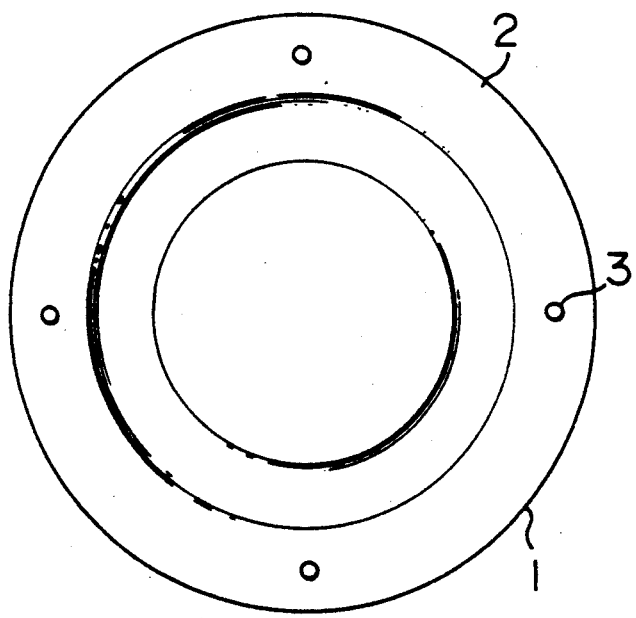
FIG. 2 is a plan view of the diaphragm of FIG. 1.

On each sample of the blend compositions shown in the upper section of Table 8-2 consisting of the rubber (II) and the vinylidene fluoride resin (I), compounding was effected with the respective compounding formulations shown in Table 8-1 using a Banbury mixer. Each of the resulting compounds was subjected to calendering to form a sheet having a thickness of 2 mm and then to punching out to obtain pieces of 75 mm in diameter. These pieces were subjected to press-curing under the respective conditions shown in the lower section of Table 8-1, whereby diaphragms as shown in FIGS. 1 and 2 were prepared. From each diaphragm, test pieces for various tests were punched out, and subjected to measurement of characteristics by the same test methods as in Example 1-1.

The measurement results are shown in the lower section of Table 8-2.

As is obvious from Table 8-2, each diaphragm of this invention is excellent not only in gasoline resistance, gasohol resistance, sour gasoline resistance, sour gasohol resistance, ozone resistance and heat resistance but also in tensile strength, elongation and balance between gasoline resistance and low-temperature resistance.

TABLE 8-1

| Compouding formulation (parts by wt.) | a | b | c | d |
|---|---|---|---|---|
| Polymer | 100.0 | 100.0 | 100.0 | 100.0 |
| HAF carbon black*[1] | 20.0 | — | — | 60.0 |

TABLE 8-1-continued

| Compouding formulation (parts by wt.) | a | b | c | d |
|---|---|---|---|---|
| FEF carbon black*2 | — | 20.0 | 60.0 | — |
| Zinc oxide | — | 5.0 | 5.0 | — |
| Stearic acid | 1.0 | 1.0 | 1.0 | 1.0 |
| RS 700*3 | 5.0 | — | — | 5.0 |
| TP-95*4 | — | 10.0 | 10.0 | — |
| TBXP*5 | 5.0 | — | — | 5.0 |
| TT*6 | — | 1.5 | 1.5 | — |
| CZ*7 | — | 2.0 | 2.0 | — |
| Sulfur | — | 0.5 | 0.5 | — |
| Ammonium benzoate | 8.0 | — | — | 2.0 |
| Conditions for press-curing | 165° C. × 30 min | 165° C. × 30 min | 165° C. × 30 min | 165° C. × 30 min |

Note:
*1High abrasion furnace black
*2Fast excluding furnace black
*3Plasticizer of poly(ether ester) type, manufactured by Adeka Argus Chemical Co.
*4Di(butoxyethoxyethyl) adipate
*5Tributoxyethyl phosphate
*6Tetrathiuram disulfide
*7N-cyclohexyl-2-benzothiazolsulfenamide

TABLE 8-2

| | Example | | | | | Comparative Example | |
|---|---|---|---|---|---|---|---|
| | 8-1 | 8-2 | 8-3 | 8-4 | 8-5 | 8-1 | 8-2 |
| Vinylidene fluoride resin (I) (parts by wt.) | 30 | 30 | 30 | 10 | 50 | 0 | 0 |
| Rubber (II) (parts by wt.) | 70 | 70 | 70 | 90 | 50 | 100 | 100 |
| (1) Acrylic rubber | | | | | | | |
| Component (A) | | | | | | | |
| Ethyl acrylate (% by wt.) | 85 | | | 97 | 97 | | |
| Methoxyethyl acrylate (% by wt.) | 2 | | | | | | |
| Component (B) | | | | | | | |
| Ally glycidyl ether (% by wt.) | 3 | | | 3 | 3 | | |
| Component (C) | | | | | | | |
| Acrylonitrile (% by wt.) | 10 | | | | | | |
| (2) Nitrile rubber | | | | | | | |
| Component (D) | | | | | | | |
| Acrylonitrile (% by wt.) | | 50 | | | | 42 | |
| Component (E) | | | | | | | |
| Butadiene-1,3 (% by wt.) | | 50 | | | | 58 | |
| (3) Hydride of nitrile rubber (parts by wt.) | | | | | | | |
| Component (D) | | | | | | | |
| Acrylonitrile (% by wt.) (Hydrogenation degree: 90%) | | | 45 | | | | 45 |
| Component (E) | | | | | | | |
| Butadiene-1,3 (% by wt.) | | | 55 | | | | 55 |
| Compounding formulation (Refer to Table 8-1) | a | b | b | a | a | c | c |
| Properties of crosslinked rubber | | | | | | | |
| Tensile strength (kg/cm$^2$) | 172 | 184 | 306 | 155 | 195 | 220 | 198 |
| Elongation (%) | 380 | 320 | 555 | 410 | 450 | 330 | 520 |
| Hardness (JIS-A) | 72 | 73 | 79 | 65 | 76 | 73 | 76 |
| Gasoline resistance (after immersion at 40° C. for 48 hr in Fuel C) ΔV (%) | +45 | +19 | +20 | +58 | +22 | +30 | +35 |
| Gasohol resistance (after immersion at 40° C. for 48 hr in a solution consisting of 80 vol. % of Fuel C and 20 vol. % of ethanol) ΔV (%) | +72 | +38 | +39 | +89 | +47 | +55 | +57 |
| Sour gasoline resistance (after immersion of 40° C. to 70 hr by n cycles in Fuel C containing 2.5 wt. % of lauroyl peroxide) | | | | | | | |
| n = 3 (3 cycles) | NC* | NC | NC | NC | NC | Cracks appeared | NC |
| n = 10 (10 cycles) | NC | NC | NC | NC | NC | Cracks appeared | Cracks appeared |
| Sour gasohol resistance (after | | | | | | | |

TABLE 8-2-continued

|  | Example | | | | | Comparative Example | |
|---|---|---|---|---|---|---|---|
|  | 8-1 | 8-2 | 8-3 | 8-4 | 8-5 | 8-1 | 8-2 |
| immersion at 40° C. for 72 hr by n cycles in a solution consisting of 80 vol. % of Fuel C containing 2.5 wt. % of lauroyl peroxide and 20 vol. % of ethanol) | | | | | | | |
| n = 3 (3 cycles) | NC | NC | NC | NC | NC | Cracks appeared | NC |
| n = 10 (10 cycles) | NC | NC | NC | NC | NC | Cracks appeared | Cracks appeared |
| Heat-deterioration resistance (aged at 120° C. for 72 hr by heating with air) | | | | | | | |
| Change of tensile strength (%) | +1 | +3 | +5 | +2 | +2 | +8 | +7 |
| Change of elongation (%) | −5 | −15 | −16 | −6 | −3 | −35 | −39 |
| Change of hardness (JIS-A) (point) | +1 | +3 | +4 | +1 | +1 | +7 | +6 |
| Low-temperature resistance (Impact brittleness test) | | | | | | | |
| $T_b$ (°C.) | −25 | −30 | −55 | −23 | −30 | −20 | −35 |

EXAMPLE 9-1

30 parts by weight of JSR KYNAR 731 as the vinylidene fluoride resin (I) was blended with 60 parts by weight of an acrylic rubber consisting of 50% by weight of ethyl acrylate, 47% by weight of methoxyethyl acrylate, 3% by weight of allyl glycidyl ether and 10% by weight of acrylonitrile and having a Mooney viscosity ($ML_{1+4}$(100° C.)) of 60 and 10 parts by weight of an acrylic rubber consisting of 55% by weight of ethyl acrylate, 40% by weight of methoxyethyl acrylate and 5% by weight of acrylonitrile and having a number average molecular weight of 3,550 as the rubber (II), and the resulting blend was subjected to compounding with the compounding formulation shown in Table 9-1 and then to vulcanization. The resulting vulcanized rubber was subjected to measurement of physical properties according to the methods in Example 1-1 to obtain the results shown in Table 9-2. However, the resistance to solvent-cracking was determined by the following method:

Resistance to Solvent-Cracking

Two marking lines were drawn at a distance of 20 mm at the center on a No. 1 dumbbell and a notch of 2 mm in length was made at the center between the marking lines in parallel to the marking lines so as to go beyond the dumbbell. This test piece was set on a device capable of elongating the piece to any length and then elongated so that the elongation became 50%.

The thus elongated test piece was immersed in a solvent (Fuel C) at 40° C. and the time required until the test piece was broken was measured. The results of measurement were as shown in Table 9-2.

EXAMPLE 9-2

The same procedure as in Example 9-1 was repeated, except that 45 parts by weight of a vinylidene fluoride (91 mole %)/hexafluoropropylene (4 mole %)/tetrafluoroethylene (5 mole %) copolymer resin as the vinylidene fluoride resin (I) was blended with 45 parts by weight of a nitrile rubber consisting of 41% by weight of acrylonitrile and 59% by weight of butadiene-1,3 and having a Mooney viscosity ($ML_{1+4}$(100° C.)) of 50 and 10 parts by weight of a nitrile rubber consisting of 35% by weight of acrylonitrile and 65% by weight of butadiene-1,3 and having a number average molecular weight of 1,870 as the rubber (II), to obtain the results shown in Table 9-2.

TABLE 9-1

| Compounding formulation (parts by weight) | a | b |
|---|---|---|
| Polymer | 100.0 | 100.0 |
| Zinc oxide | — | 2.0 |
| Stearic acid | 1.0 | 1.0 |
| HAF carbon black*1 | 30.0 | — |
| SRF carbon black*2 | — | 20.0 |
| TBXP*3 | 20.0 | — |
| TP-95*4 | — | 15.0 |
| Accelerator TT*5 | — | 0.75 |
| Accelerator CZ*6 | — | 1.0 |
| Sulfur | — | 0.25 |
| Hexamethylenediamine carbamate | 1.0 | — |
| Conditions for press-curing | 160° C. × 60 min | 170° C. × 20 min |

Note:
*1High abrasion furnace black
*2Semi-reinforcing furnace black
*3Tributoxyethyl phosphate
*4Di(butoxyethoxyethyl) adipate
*5Tetramethylthiuram disulfide
*6N-cyclohexyl-2-benzothiazol sulfonamide

TABLE 9-2

| Properties of crosslinked rubber | Example | |
|---|---|---|
|  | 9-1 | 9-2 |
| Tensile strength (kg/cm²) | 138 | 182 |
| Elongation (%) | 580 | 300 |
| Hardness (JIS-A) | 77 | 82 |
| Gasoline resistance (Δv %) (after immersion at 40° C. for 48 hr in Fuel C) | +11 | +17 |
| Gasohol resistance (Δv %) (after immersion at 40° C. for 48 hr in a solution consisting of 80 vol. % of Fuel C and 20 vol. % of ethanol | +35 | +34 |
| Sour gasoline resistance (after immersion at 40° C. for 72 hr by n cycles in Fuel C containing 2.5 wt. % of lauroyl peroxide) | | |
| n = 3 (3 cycles) | NC*a | NC |
| n = 10 (10 cycles) | NC | NC |
| Sour gasohol resistance (after immersion at 40° C. for 72 hr by n cycles in a solution consisting of 80 vol. % of Fuel C containing 2.5 wt. % |  |  |

TABLE 9-2-continued

| Properties of crosslinked rubber | Example 9-1 | Example 9-2 |
|---|---|---|
| lauroyl peroxide and 20 vol. % of ethanol) | | |
| n = 3 (3 cycles) | NC | NC |
| n = 6 (6 cycles) | NC | NC |
| n = 10 (10 cycles) | NC | NC |
| Heat-deterioration resistance (aged at 120° C. for 72 hr by heating with air) | | |
| Change of tensile strength (%) | +15 | +12 |
| Change of elongation (%) | −24 | −28 |
| Change of hardness (JIS-A) (point) | +11 | +8 |
| Low-temperature resistance (Gheman torsion test) | | |
| $T_{100}$ (°C.) | −52 | −65 |
| Resistance to solvent-cracking (immersion at 40° C. on 50% elongation), time to breakage (sec.) | 1320 | 625 |

Note:
*"NC means no cracking

What is claimed is:

1. A vulcanizable rubber composition comprising (1) 100 parts by weight of a polymer composition comprising:

(I) a vinylidene fluoride resin containing at least 90 mole % vinylidene fluoride, (II) at least one rubber selected from the group consisting of acrylic rubbers, α,β-unsaturated nitrile-conjugate diene copolymer rubbers and hydrides of α,β-unsaturated nitrile-conjugated diene copolymer rubbers, said acrylic rubber consisting of (A) 30 to 99.9% by weight of an alkyl acrylate and/or an alkoxy-substituted alkyl acrylate, (B) 0.1 to 10% by weight of a cross-linkable monomer and (C) 0 to 70% by weight of another ethylenically unsaturated compound copolymerizable with (A) and (B) (the sum of (A), (B) and (C) is 100% weight), and said α,β-unsaturated nitrile-conjugated diene copolymer rubber consisting of (D) 10 to 60% by weight of an α,β-unsaturated nitrile, (E) 15 to 90% by weight of a conjugated diene and (F) 0 to 75% by weight of another ethylenically unsaturated compound copolymerizable with (D) and (E) (the sum of (D), (E) and (F) is 100% by weight), and (III) an optional blendable polymer, wherein the weight ratio of (I)/[(II)+(III)] is 5/95 to 60/40 and the weight ratio of (II)/(III) is 100/0 to 50/50, and (2) 0 to 40 parts by weight of a plasticizer.

2. The rubber composition according to claim 18, wherein the plasticizer (2), if present, is at least one member selected from the group consisting of phosphoric acid derivatives, adipic acid derivatives, polyester compounds, polyether compounds and poly(ether ester) compounds.

3. The rubber composition according to claim 1, wherein the optional blendable polymer (III) is a fluororubber, an epichlorohydrin rubber, a chlorosulfonated polyethylene or a poly(vinyl chloride).

4. The rubber composition according to claim 1, wherein the rubber (II) is a mixture of 100 to 60% by weight of an acrylic rubber having a Mooney viscosity ($ML_{1+4}(100°$ C.)) of 20 to 120 and 0 to 40% by weight of an acrylic rubber having a number average molecular polymer of 500 to 10,000.

5. The rubber composition according to claim 1 wherein the rubber (II) is mixture of 100 to 60% by weight of an α,β-unsaturated nitrile-conjugated diene copolymer rubber having a Mooney viscosity ($ML_{1+4}(100°$ C.)) of 20 to 150 and/or its hydride and 0 to 40% by weight of an α,β-unsaturated nitrile-conjugated diene copolymer rubber having a number average molecular weight of 500 to 10,000 and/or its hydride.

6. The rubber composition according to claim 1 wherein the rubber (II) is an α,β-unsaturated nitrileconjugated diene copolymer rubber in which the diene portions are hydrogenated by 50% or more.

7. The rubber composition according to claim 1, wherein the rubber (II) is at least one rubber selected from the acrylic rubbers and the hydrides of α,β-unsaturated diene copolymer rubbers, and the weight ratio of the vinylidene fluoride resin (I)/the rubber (II) is 5/95 to vinylidene fluoride resin (I)/the rubber (II) is 5/95 to 60/40.

8. The rubber composition according to claim 1, wherein the rubber (II) is the acrylic rubber, and the weight ratio of the vinylidene fluoride resin (I)/the rubber (II) is 5/95 to 60/40.

9. A diaphragm in which the fluid-contacting surface is made from a vulcanizable rubber composition according to claim 1.

10. A rubber hose made from a vulcanizable rubber composition according to claim 1.

* * * * *